(12) United States Patent
Duan et al.

(10) Patent No.: US 11,310,080 B2
(45) Date of Patent: Apr. 19, 2022

(54) VXLAN CONFIGURATION METHOD, DEVICE, AND SYSTEM

(71) Applicant: Huawei Technologies Co., Ltd., Shenzhen (CN)

(72) Inventors: Fanghong Duan, Nanjing (CN); Yongsheng Geng, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 190 days.

(21) Appl. No.: 16/861,914

(22) Filed: Apr. 29, 2020

(65) Prior Publication Data

US 2020/0267022 A1 Aug. 20, 2020

Related U.S. Application Data

(63) Continuation of application No. PCT/CN2018/088038, filed on May 23, 2018.

(30) Foreign Application Priority Data

Nov. 9, 2017 (CN) .......................... 201711100410.3

(51) Int. Cl.
*H04L 12/46* (2006.01)
*G06F 9/455* (2018.01)
(Continued)

(52) U.S. Cl.
CPC ...... *H04L 12/4675* (2013.01); *G06F 9/45558* (2013.01); *H04L 12/4633* (2013.01);
(Continued)

(58) Field of Classification Search
CPC ............. H04L 12/4675; H04L 12/4633; H04L 41/0213; H04L 41/0803; H04L 41/0886; G06F 9/45558; G06F 2009/45595
See application file for complete search history.

(56) References Cited

U.S. PATENT DOCUMENTS 10,193,707 B2 * 1/2019 Zhang ................. H04L 12/4641
11,012,261 B2 * 5/2021 Yang .................... H04L 12/4633
(Continued)

FOREIGN PATENT DOCUMENTS

CN        1878115 A      12/2006
CN      104243268 A      12/2014
(Continued)

OTHER PUBLICATIONS

Davoli, R., et al., "VXVDE: A Switch-free VXLAN Replacement," 2015, 6 pages.
(Continued)

*Primary Examiner* — Habte Mered

(74) *Attorney, Agent, or Firm* — Conley Rose, P.C.

(57) ABSTRACT

In a VXLAN configuration method, a first network device obtains configuration information, generates first GRASP information based on the configuration information, and sends the first GRASP information to a second network device, where the configuration information includes VTEP device information, a plurality of pieces of VTEP device information are respectively used to indicate a plurality of VTEPs included in a VXLAN, the first GRASP information includes objective information, and the objective information is used to carry the configuration information. The second network device receives the first GRASP information and establishes a VXLAN tunnel based on the first GRASP information. In this way, automatic VXLAN configuration is implemented.

22 Claims, 12 Drawing Sheets

(51) Int. Cl.
   *H04L 12/24*      (2006.01)
   *H04L 41/0213*    (2022.01)
   *H04L 41/0803*    (2022.01)
   *H04L 41/08*      (2022.01)

(52) U.S. Cl.
   CPC ...... *H04L 41/0213* (2013.01); *H04L 41/0803* (2013.01); *H04L 41/0886* (2013.01); *G06F 2009/45595* (2013.01)

(56) References Cited

U.S. PATENT DOCUMENTS

| | | | |
|---|---|---|---|
| 2015/0200954 A1* | 7/2015 | Gourlay | H04L 41/0816 726/4 |
| 2016/0344622 A1 | 11/2016 | Liu et al. | |
| 2017/0214549 A1* | 7/2017 | Yoshino | H04L 12/4641 |
| 2017/0230197 A1 | 8/2017 | Zhang et al. | |
| 2017/0302476 A1* | 10/2017 | Yang | H04L 12/4633 |
| 2017/0331641 A1* | 11/2017 | Fu | H04L 12/4679 |
| 2018/0069792 A1* | 3/2018 | Gao | H04L 12/46 |

FOREIGN PATENT DOCUMENTS

| | | |
|---|---|---|
| CN | 104468394 A | 3/2015 |
| CN | 104767666 A | 7/2015 |
| CN | 105282003 A | 1/2016 |
| CN | 105591916 A | 5/2016 |
| CN | 105812221 A | 7/2016 |
| CN | 106209553 A | 12/2016 |
| CN | 106878065 A | 6/2017 |
| CN | 107147580 A | 9/2017 |
| CN | 107294711 A | 10/2017 |

OTHER PUBLICATIONS

Carpenter,. B., Ed., et al., "A Generic Autonomic Signaling Protocol (GRASP)," draft-ietf-anima-grasp-00, Aug. 14, 2015, 9 pages.

Yang, G., et al., "Research and Implementation of VXLAN Technology Based under SDN Architecture," Jun. 2015, 71 pages.

Gont, F., A Method for Generating Semantically Opaque Interface Identifiers with IPv6 Stateless Address Autoconfiguration (SLAAC), RFC 7217, Apr. 2014, 20 pages.

Behringer, M., Ed. et al, "An Autonomic Control Plane (ACP)," draft-ietf-anima-autonomic-control-plane-12, Anima WG Internet-Draft, Oct. 12, 2017, 106 pages.

* cited by examiner

| Message type (message_type) | Session identifier (session-id) | Initiator (initiator) | TTL | Objective name (objective-name) | Objective flag (objective-flag) | Loop count (loop-count) | Objective value (objective-value) |
|---|---|---|---|---|---|---|---|

GRASP packet header: Message type, Session identifier, Initiator

Objective information: Objective flag, Loop count

First GRASP information: TTL, Objective name, Objective information

FIG. 3B

VXLAN CONFIGURATION METHOD, DEVICE, AND SYSTEM

CROSS-REFERENCE TO RELATED APPLICATIONS

This is a continuation of Int'l Patent App. No. PCT/CN2018/088038 filed on May 23, 2018, which claims priority to Chinese Patent App. No. 201711100410.3 filed on Nov. 9, 2017, which are incorporated by reference.

TECHNICAL FIELD

This disclosure relates to the field of communications technologies, and in particular, to a virtual extensible local area network (VXLAN) configuration method, a device, and a system.

BACKGROUND

A VXLAN is a technology in which a layer 2 packet is encapsulated by using a layer 3 protocol. The VXLAN technology relates to a packet in a media access control (MAC)-in-User Datagram Protocol (UDP) format. Specifically, an Ethernet frame based on a MAC protocol is encapsulated in a UDP packet. Further, the UDP packet is encapsulated in an Internet Protocol (IP) packet, and the IP packet may be transmitted in a layer 3 network. Therefore, the Ethernet frame is transmitted in the layer 3 network. A VXLAN network identifier (VNI) is used to identify a VXLAN segment in the VXLAN technology. Different VXLAN segments respectively correspond to different VNIs. Different VXLAN segments are isolated from each other. When two virtual machines (VMs) corresponding to a same VNI communicate with each other, a VXLAN layer 3 (L3) gateway is not required. When two VMs corresponding to different VNIs communicate with each other, a VXLAN layer 3 gateway is required. A VNI field includes 24 bits. One management domain can include a maximum of 216 VXLAN segments. A VXLAN tunnel end point (VTEP) may be integrated into a network virtualization edge (NVE) device, and is used as an edge device in the VXLAN. The NVE device transmits traffic of the VXLAN through a VXLAN tunnel. The VXLAN tunnel is a point-to-point logical tunnel between two NVE devices.

Currently, the VXLAN is mainly configured manually. For example, when a user plans to create a VXLAN tunnel between dev1 and dev2 and a VXLAN tunnel between dev1 and dev3, a configuration process includes the following steps: Step 1: The user performs network planning, determines that the VXLAN tunnels need to be established between dev1 and dev2 and between dev1 and dev3, and determines data such as an IP address that needs to be used on an interface of each of dev1, dev2, and dev3, a VNI required by each device, and an access point of each device. Step 2: The user separately delivers configurations to dev1, dev2, and dev3, to configure a loopback address of each device, an interface address and a network segment of the device, a routing protocol, and the like. Step 3: The user separately delivers configurations to dev1, dev2, and dev3, to configure an NVE virtual interface and the like of each device. Step 4: The user separately delivers configurations to dev1, dev2, and dev3, to configure a layer 2 sub-interface of each device and a BD to which a VM connected to the layer 2 sub-interface belongs, and to configure a VNI and the like for each BD. The VNI is used to indicate the BD to which the VM belongs, and the BD may be referred to as a broadcast domain (BD) or a bridge domain (BD).

It can be learned from the foregoing that there is a relatively large quantity of existing steps of manually configuring the VXLAN, and the VXLAN needs to be configured for devices one by one. When there is a relatively large quantity of devices in a network, configuration efficiency is low, and an error rate is relatively high.

SUMMARY

This disclosure provides a VXLAN configuration method, a device, and a system, to resolve existing problems of low configuration efficiency and a relatively high error rate during VXLAN configuration.

To achieve the foregoing objectives, the following technical solutions are used in this disclosure.

According to a first aspect, a VXLAN configuration method is provided. A first network device obtains configuration information, where the configuration information includes a plurality of pieces of VTEP device information, and the plurality of pieces of VTEP device information are respectively used to indicate a plurality of VTEPs included in a VXLAN. The first network device generates first Generic Autonomic Signaling Protocol (GRASP) information based on the configuration information, where the first GRASP information includes objective information, the objective information is used to carry the configuration information, and the first network device runs an autonomic networking integrated model and approach (ANIMA) protocol. The first network device sends the first GRASP information to a second network device, where the first GRASP information is used to trigger the second network device to establish a VXLAN tunnel based on the first GRASP information.

Based on the solution provided in this embodiment, the first network device may obtain the configuration information used to indicate the plurality of VTEPs included in the VXLAN, add the configuration information to the GRASP information, and send the GRASP information to the second network device. The second network device may create the VXLAN tunnel based on the GRASP information. VXLAN configuration is completed by exchanging information between network devices, so that automatic VXLAN configuration is implemented, and existing problems of low VXLAN configuration efficiency and a relatively high error rate are avoided.

In a possible implementation of the first aspect, each of the plurality of pieces of VTEP device information includes a VTEP device identifier and a VNI, and the VTEP device identifier corresponds to the VNI. When the first network device determines that a device identifier of the first network device is the same as a first VTEP device identifier included in first VTEP device information, the first network device determines that the first network device is a first VTEP, where the first VTEP device information is used to indicate the first VTEP. The first network device generates first VTEP information based on the first VTEP device information, where the first VTEP device information further includes a first VNI corresponding to the first VTEP device identifier, the first VTEP information includes a first VTEP address and the first VNI, and the first VTEP address is bound to the first VNI. The first network device sends second GRASP information to the second network device, where the second GRASP information includes the first VTEP information.

Based on the foregoing implementation, the first network device may determine, based on content included in the configuration information, that the first network device is the VTEP, generate the VTEP information of the first network device, add the VTEP information of the first network device to the GRASP information, and send the GRASP information to the second network device, so that the second network device automatically creates a VXLAN tunnel from the second network device to the first network device based on the VTEP information of the first network device and VTEP information of the second network device.

In another possible implementation of the first aspect, the first network device receives third GRASP information sent by the second network device, where the third GRASP information includes second VTEP information, the second VTEP information includes a second VTEP address and a second VNI, and the second VTEP address is bound to the second VNI; and the first network device establishes a VXLAN tunnel from the first network device to the second network device based on the first VTEP information and the second VTEP information when the first network device determines that the first VNI is the same as the second VNI.

Based on the foregoing implementation, the first network device may receive the GRASP information that is sent by the second network device and that carries the VTEP information of the second network device, and automatically create the VXLAN tunnel from the first network device to the second network device based on the VTEP information of the second network device in the GRASP information and the VTEP information of the first network device.

In still another possible implementation of the first aspect, each of the plurality of pieces of VTEP device information further includes a VTEP access-side port identifier, and the VTEP access-side port identifier corresponds to the VTEP device identifier. The first network device determines, based on a first VTEP access-side port identifier included in the first VTEP device information, a layer 2 sub-interface of the first network device and a first BD corresponding to the layer 2 sub-interface, where the first VTEP access-side port identifier corresponds to the first VTEP device identifier, the layer 2 sub-interface is configured to connect to a virtual machine VM, and the first VNI is used to indicate that the VM belongs to the first BD.

Based on the foregoing implementation, the first network device may automatically determine, based on access-side port information included in the configuration information, the layer 2 sub-interface of the first network device and the BD corresponding to the layer 2 sub-interface. Therefore, after establishing a VXLAN tunnel between the first network device and another network device, the first network device determines the layer 2 sub-interface of the first network device, and the BD corresponding to the VM connected to the layer 2 sub-interface, so as to convert virtual local area network (VLAN) information of the VM into information identified by a VNI, and send the information by using the VXLAN tunnel.

In still another possible implementation of the first aspect, the first VTEP device information further includes a first loopback address, the first loopback address corresponds to the first VTEP device identifier, the first network device generates the first VTEP information based on the first VTEP device information, and the first network device determines the first loopback address as the first VTEP address.

Based on the foregoing implementation, the first network device may use the loopback address included in the configuration information as the VTEP address of the first network device. In this way, VXLAN configuration efficiency is improved.

According to a second aspect, a VXLAN configuration method is provided. A second network device receives first GRASP information sent by a first network device, where the first GRASP information includes objective information, the objective information is used to carry configuration information, the configuration information includes a plurality of pieces of virtual extensible local area network tunnel end point VTEP device information, each of the plurality of pieces of VTEP device information includes a VTEP device identifier and a VXLAN network identifier VNI, and the VTEP device identifier corresponds to the VNI. When the second network device determines that a device identifier of the second network device is the same as a second VTEP device identifier included in second VTEP device information, the second network device determines that the second network device is a second VTEP, where the second VTEP device information is used to indicate the second VTEP. The second network device generates second VTEP information based on the second VTEP device information, where the second VTEP device information further includes a second VNI corresponding to the second VTEP device identifier, the second VTEP information includes a second VTEP address and the second VNI, and the second VTEP address is bound to the second VNI. The second network device sends second GRASP information to a third network device, where the second GRASP information includes the second VTEP information, and the second GRASP information is used to trigger the third network device to establish a VXLAN tunnel based on the second GRASP information.

Based on the solution provided in this embodiment, the second network device may receive the GRASP information that is sent by the first network device and that carries the configuration information, generate the VTEP information after determining, based on content included in the configuration information, that the second network device is the VTEP, add the generated VTEP information to the GRASP information, and send the GRASP information to the third network device, so that the third network device automatically creates the VXLAN tunnel from the third network device to the second network device based on the VTEP information of the second network device and VTEP information of the third network device.

In another possible implementation of the second aspect, the second network device receives third GRASP information sent by the third network device, where the third GRASP information includes first VTEP information, the first VTEP information includes a first VTEP address and a first VNI, and the first VTEP address is bound to the first VNI; and the second network device establishes a VXLAN tunnel from the second network device to the third network device based on the first VTEP information and the second VTEP information when the second network device determines that the first VNI is the same as the second VNI.

Based on the foregoing implementation, the second network device may receive the GRASP information that is sent by a peer end (the third network device) and that carries VTEP information of the third network device, and automatically create the VXLAN tunnel from the second network device to the third network device based on the VTEP information of the third network device in the GRASP information and the VTEP information of the second network device.

In still another possible implementation of the second aspect, the third network device is the first network device.

Based on the foregoing implementation, the first network device has a function of obtaining configuration information and sending the configuration information to another network device, and also has a function of serving as a VTEP and creating a VXLAN tunnel.

In still another possible implementation of the second aspect, the second network device forwards the first GRASP information to the third network device, where the first GRASP information is used to trigger the third network device to establish a VXLAN tunnel based on the first GRASP information.

Based on the foregoing possible implementation, the second network device may be used as a relay node to forward the configuration information to another network device.

In still another possible implementation of the second aspect, each of the plurality of pieces of VTEP device information further includes a VTEP access-side port identifier, and the VTEP access-side port identifier corresponds to the VTEP device identifier. The second network device determines, based on a second VTEP access-side port identifier included in the second VTEP device information, a layer 2 sub-interface of the second network device and a first BD corresponding to the layer 2 sub-interface, where the second VTEP access-side port identifier corresponds to the second VTEP device identifier, the layer 2 sub-interface is configured to connect to a virtual machine VM, and the second VNI is used to indicate that the VM belongs to the first BD.

Based on the foregoing implementation, the second network device may automatically determine, based on access-side port information included in the configuration information, the layer 2 sub-interface of the second network device and the BD corresponding to the layer 2 sub-interface. Therefore, after establishing a VXLAN tunnel between the second network device and another network device, the second network device determines the layer 2 sub-interface of the second network device, and the BD corresponding to the VM connected to the layer 2 sub-interface, so as to convert VLAN information of the VM into information identified by a VNI, and send the information by using the VXLAN tunnel.

In still another possible implementation of the second aspect, after the second network device determines that the second network device is the second VTEP, the second network device generates a second loopback address, where the second loopback address includes an identifier of the second network device, a reserved bit, and a fixed value; and the second network device determines the second loopback address as the second VTEP address.

Based on the foregoing implementation, the second network device may automatically generate the loopback address, and use the automatically generated loopback address as the VTEP address of the second network device.

According to a third aspect, a first network device is provided, and the first network device has a function of implementing behavior of the first network device in any one of the first aspect or the implementations of the first aspect. The function may be implemented based on hardware, or may be implemented based on hardware executing corresponding software. The hardware or the software includes one or more modules corresponding to the foregoing function. This is not limited.

In a possible design, a structure of the first network device includes a processor and an interface. The processor is configured to support the first network device in performing a corresponding function in the foregoing method. The interface is configured to: support communication between the first network device and a second network device; and send information or an instruction in the foregoing method to the second network device, or receive information or an instruction in the foregoing method from the second network device. The first network device may further include a memory. The memory is configured to be coupled to the processor, and the memory stores a program instruction and data that are necessary for the first network device.

In another possible design, the first network device includes a processor, a receiver, a transmitter, a random access memory, a read-only memory, and a bus. The processor is separately coupled to the receiver, the transmitter, the random access memory, and the read-only memory by using the bus. When the first network device needs to run, a bootloader in a basic input/output system or an embedded system that is built into the read-only memory is used to boot a system to start, and boot the first network device to enter a normal running state. After the first network device enters the normal running state, an application program and an operating system are run in the random access memory, to enable the processor to perform the method in any one of the first aspect or the possible implementations of the first aspect.

According to a fourth aspect, a first network device is provided, and the first network device includes a main control board and an interface board, and may further include a switching board. The first network device is configured to perform the method in any one of the first aspect or the possible implementations of the first aspect. Specifically, the first network device includes a module configured to perform the method in any one of the first aspect or the possible implementations of the first aspect.

According to a fifth aspect, a first network device is provided. The first network device includes a controller and a first forwarding sub-device. The first forwarding sub-device includes an interface board, and may further include a switching board. The first forwarding sub-device is configured to perform a function of the interface board in the fourth aspect, and may further perform a function of the switching board in the fourth aspect. The controller includes a receiver, a processor, a transmitter, a random access memory, a read-only memory, and a bus. The processor is separately coupled to the receiver, the transmitter, the random access memory, and the read-only memory by using the bus. When the controller needs to run, a bootloader in a basic input/output system or an embedded system that is built into the read-only memory is used to boot a system to start, and boot the controller to enter a normal running state. After the controller enters the normal running state, an application program and an operating system are run in the random access memory, to enable the processor to perform a function of the main control board in the fourth aspect.

According to a sixth aspect, a computer storage medium is provided and is configured to store a program, code, or an instruction used by the foregoing first network device, and when a processor or a hardware device executes the program, the code, or the instruction, functions or steps of the first network device in the foregoing aspects may be completed.

According to a seventh aspect, a second network device is provided, and the second network device has a function of implementing behavior of the second network device in any one of the second aspect or the implementations of the second aspect. The function may be implemented based on hardware, or may be implemented based on hardware executing corresponding software. The hardware or the software includes one or more modules corresponding to the foregoing function. This is not limited.

In a possible design, a structure of the second network device includes a processor and an interface. The processor is configured to support the second network device in performing a corresponding function in the foregoing method. The interface is configured to: support communication between the second network device and a first network device or communication between the second network device and a third network device; and send information or an instruction in the foregoing method to the first network device or the third network device, or receive information or an instruction in the foregoing method from the first network device or the third network device. The second network device may further include a memory. The memory is configured to be coupled to the processor, and the memory stores a program instruction and data that are necessary for the second network device.

In another possible design, the second network device includes a processor, a receiver, a transmitter, a random access memory, a read-only memory, and a bus. The processor is separately coupled to the receiver, the transmitter, the random access memory, and the read-only memory by using the bus. When the second network device needs to run, a bootloader in a basic input/output system or an embedded system that is built into the read-only memory is used to boot a system to start, and boot the second network device to enter a normal running state. After the second network device enters the normal running state, an application program and an operating system are run in the random access memory, to enable the processor to perform the method in any one of the second aspect or the possible implementations of the second aspect.

According to an eighth aspect, a second network device is provided, and the second network device includes a main control board and an interface board, and may further include a switching board. The second network device is configured to perform the method in any one of the second aspect or the possible implementations of the second aspect. Specifically, the second network device includes a module configured to perform the method in any one of the second aspect or the possible implementations of the second aspect.

According to a ninth aspect, a second network device is provided. The second network device includes a controller and a first forwarding sub-device. The first forwarding sub-device includes an interface board, and may further include a switching board. The first forwarding sub-device is configured to perform a function of the interface board in the eighth aspect, and may further perform a function of the switching board in the eighth aspect. The controller includes a receiver, a processor, a transmitter, a random access memory, a read-only memory, and a bus. The processor is separately coupled to the receiver, the transmitter, the random access memory, and the read-only memory by using the bus. When the controller needs to run, a bootloader in a basic input/output system or an embedded system that is built into the read-only memory is used to boot a system to start, and boot the controller to enter a normal running state. After the controller enters the normal running state, an application program and an operating system are run in the random access memory, to enable the processor to perform a function of the main control board in the eighth aspect.

According to a tenth aspect, a computer storage medium is provided and is configured to store a program, code, or an instruction used by the foregoing second network device, and when a processor or a hardware device executes the program, the code, or the instruction, functions or steps of the second network device in the foregoing aspects may be completed.

According to an eleventh aspect, a VXLAN configuration system is provided. The VXLAN configuration system includes a first network device and a second network device, the first network device is the first network device in the third aspect, the fourth aspect, the fifth aspect, or the sixth aspect, and the second network device is the second network device in the seventh aspect, the eighth aspect, the ninth aspect, or the tenth aspect.

According to the foregoing solutions, in the VXLAN configuration method, the device, and the system provided in the embodiments, after obtaining the configuration information used to indicate the plurality of VTEPs included in the VXLAN, the first network device adds the configuration information to the GRASP information, and sends the GRASP information to the second network device. The second network device determines, based on content included in the configuration information, that the second network device is the VTEP. The second network device generates the VTEP information, and sends the GRASP information that carries the VTEP information of the second network device to the third network device. The third network device creates the VXLAN tunnel based on the VTEP information of the second network device and the VTEP information of the third network device. Similarly, the third network device may also send the VTEP information of the third network device to the second network device, and the second network device creates the VXLAN tunnel based on the VTEP information of the second network device and the VTEP information of the third network device. In this way, VXLAN configuration is completed by exchanging information between network devices, so that automatic VXLAN configuration is implemented, and existing problems of low VXLAN configuration efficiency and a relatively high error rate are avoided.

BRIEF DESCRIPTION OF DRAWINGS

FIG. 3B is a schematic diagram of a format of GRASP information according to an embodiment.

DESCRIPTION OF EMBODIMENTS

The following describes implementations of this disclosure in detail with reference to accompanying drawings.

Figure 1:
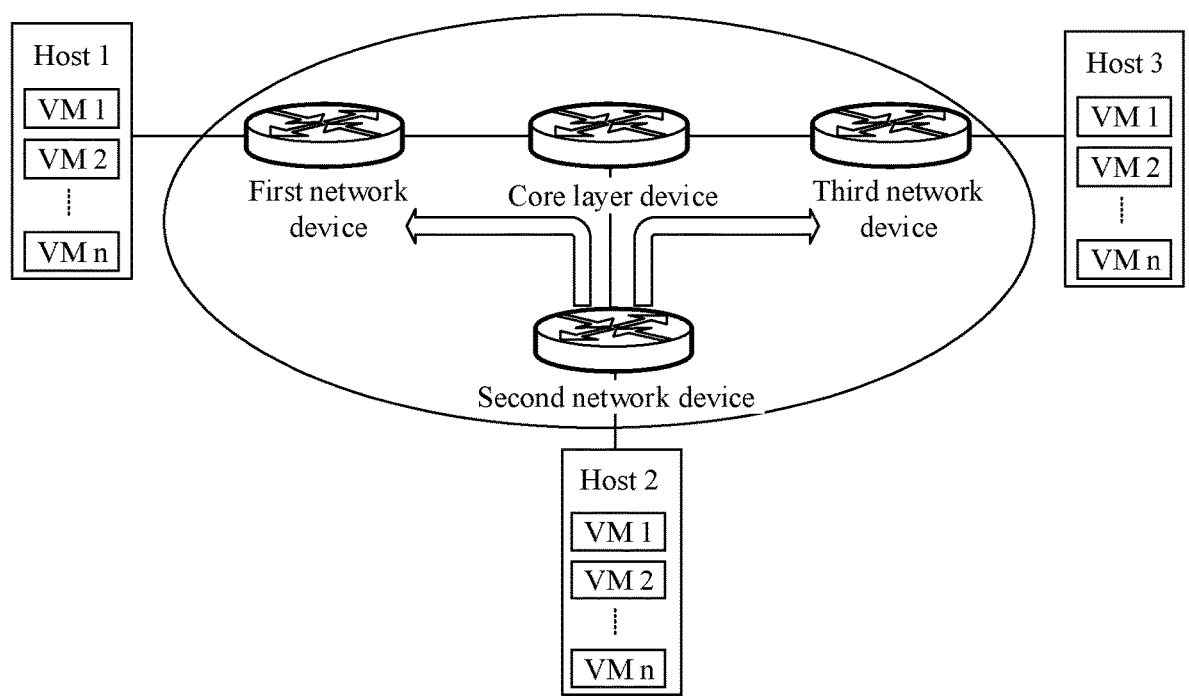
FIG. 1 is a schematic structural diagram of an Ethernet virtual private network (EVPN)-virtual private wire service (VPWS) network according to an embodiment.

A VXLAN configuration method may be used to configure a layer 3 routed network into a VXLAN, and may be further used to configure a layer 2 switched network or another data center network into a VXLAN. This is not limited. The VXLAN configuration method is described below in detail by using an example in which a network shown in FIG. 1 is configured into a VXLAN. For a process in which another network is configured into a VXLAN, refer to the solutions provided.

As shown in FIG. 1, the network may include a core layer device, a first network device, a second network device, a third network device, and hosts. The core layer device is a high-speed switching backbone of the network, and can process all traffic from a network device. The core layer device may be a device such as a router that supports a layer 2 switching technology. The first network device, the second network device, and the third network device may be provider edge (PE) devices (for example, routers or switches), are configured to connect sites such as the hosts to the network, and are responsible for some user management functions (such as address authentication, user authentication, and charging management) and user information (such as an IP address, a MAC address, and an access log of a user) collection work. The host may be a customer edge (CE) device (for example, a router or a switch), is connected to the network device, and accesses the network by using the network device. A plurality of VMs may be created on each host. A VM may send a data packet to another device such as a target VM or a host by using the network device and the core layer device.

Figure 2:
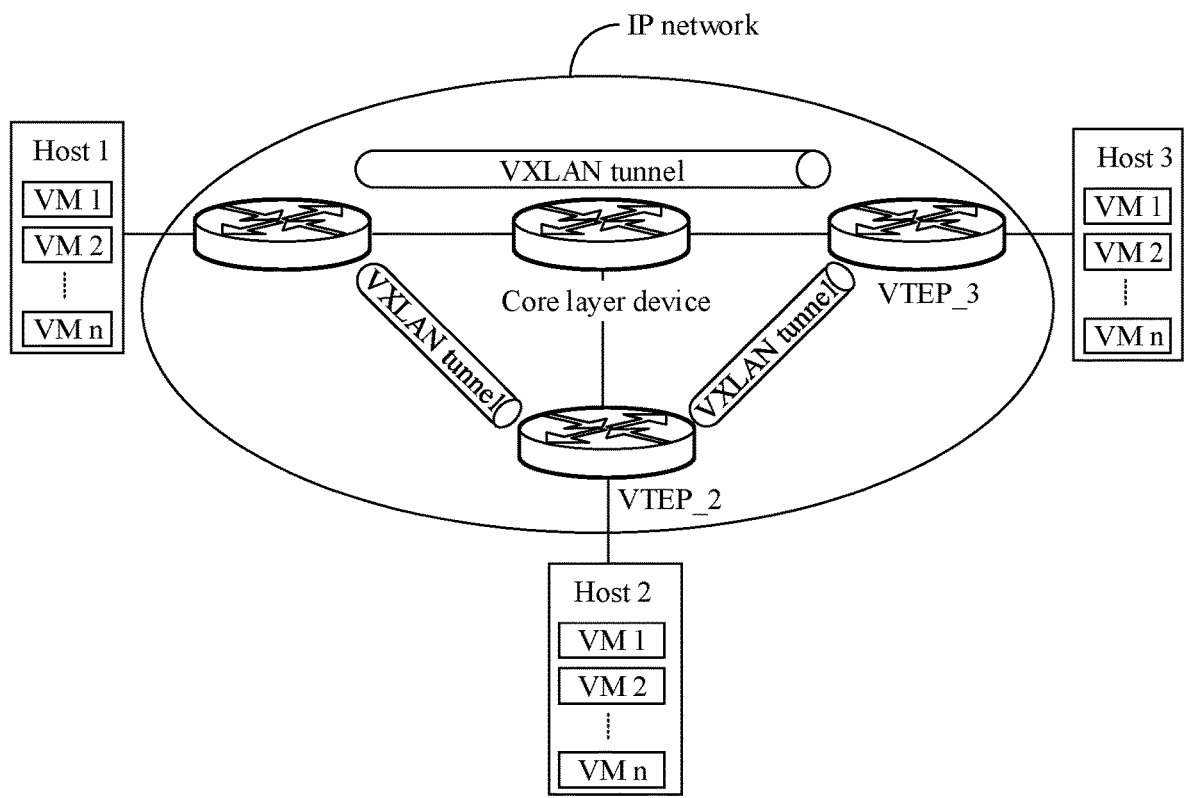
FIG. 2 is a schematic structural diagram of a VXLAN according to an embodiment.

To improve a network isolation capability of the network shown in FIG. 1 and avoid a limitation on virtual machine migration, the network shown in FIG. 1 may be configured into a VXLAN shown in FIG. 2 by using the VXLAN configuration method provided. For example, each network device connected to a host is used as a VTEP, and a VXLAN tunnel may be established between different VTEPs. VMs belonging to a same VXLAN can communicate with each other at layer 2 through a VXLAN tunnel, and VMs belonging to different VXLANs are isolated at layer 2.

Figure 3A:
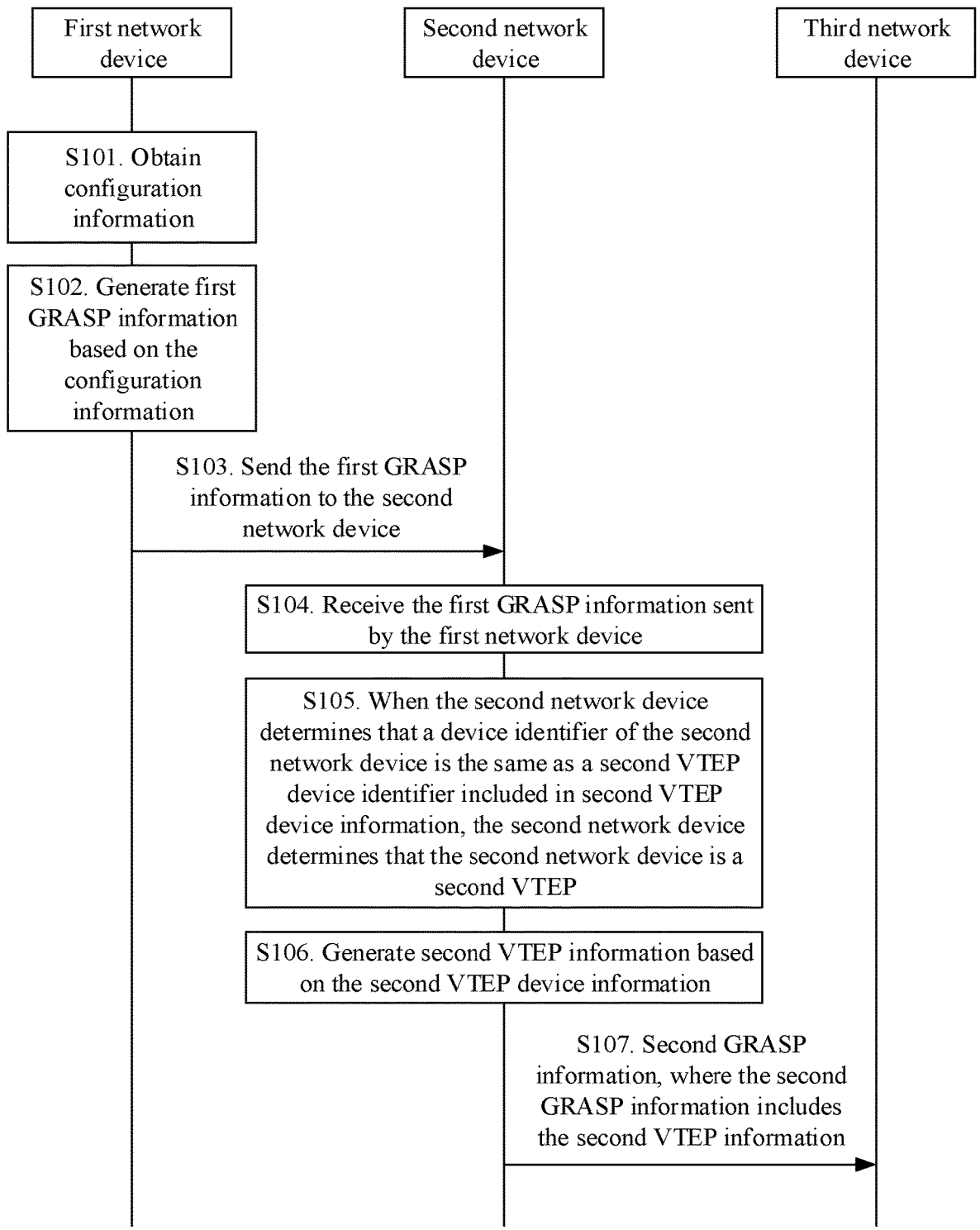
FIG. 3A is a flowchart of a VXLAN configuration method according to an embodiment.

FIG. 3A is a flowchart of a VXLAN configuration method according to an embodiment. The method shown in FIG. 3A may be used to configure the network shown in FIG. 1 into a VXLAN. The network shown in FIG. 1 may include a first network device, a second network device, and a third network device. The method shown in FIG. 3A includes S101 to S107.

S101. The First Network Device Obtains Configuration Information.

The first network device may be a PE located in a core network, and the PE may be a router or a switch. In a VXLAN scenario, a PE device may be referred to as an NVE device, or an NVE device is integrated into a PE, or an NVE device serves as an independent device and communicates with a PE device. A VTEP entity or a VTEP device (which is briefly referred to as a VTEP) may be integrated into the NVE device. This is not limited. In this embodiment, the first network device runs an ANIMA protocol and has an autonomic function, to minimize dependency on a network administrator or a centralized management system.

The configuration information may depend on a VXLAN networking requirement of a user. The configuration information specifies a specific device serving as a VTEP in a VXLAN, related information of the VTEP, and the like. Specifically, the configuration information may include a plurality of pieces of VTEP device information, and the plurality of pieces of VTEP device information may be respectively used to indicate a plurality of VTEPs included in a VXLAN. Each piece of VTEP device information may include but is not limited to a VTEP device identifier and a VNI, and the VTEP device identifier corresponds to the VNI.

The VNI is used to distinguish between virtual network instances. The virtual network instance may be a layer 2 virtual network instance or a layer 3 virtual network instance, and different virtual network instances correspond to different VNIs. Different virtual network instances are isolated from each other. When two VMs corresponding to a same VNI communicate with each other, a VXLAN layer 3 gateway is not required. When two VMs corresponding to different VNIs communicate with each other, a VXLAN layer 3 gateway may be required. A VNI field includes 24 bits. One management domain can include a maximum of $2^{16}$ VXLAN segments.

The VTEP device identifier is used to uniquely identify a device used as a VTEP. The VTEP device identifier may be a serial number (SN) of the VTEP or a MAC address of the VTEP. This is not limited.

For example, if the user determines that a VXLAN tunnel needs to be established between a device 1 and a device 2, a VXLAN tunnel needs to be established between the device 1 and a device 3, a device identifier of the device 1 is 001, a device identifier of the device 2 is 002, and a device identifier of the device 3 is 003, devices used as VTEPs in the VXLAN are respectively the device 1, the device 2, and the device 3. The configuration information obtained by the first network device may be shown in Table 1. In the configuration information, VNIs corresponding to a VTEP device identifier 001 are a vni 101 and a vni 102, a VNI corresponding to a VTEP device identifier 002 is the vni 101, and a VNI corresponding to a VTEP device identifier 003 is the vni 102. In this way, when obtaining the configuration information, the device 1, the device 2, and the device 3 may determine, based on VTEP device identifiers that are included in the configuration information and that are the same as the device identifiers of the device 1, the device 2, and the device 3, that the device 1, the device 2, and the device 3 are VTEPs, and further establish VXLAN tunnels to peer ends. VNIs corresponding to the peer ends are the same as VNIs corresponding to the device 1, the device 2, and the device 3. For example, after obtaining information shown in Table 1, the device 1 determines, by searching Table 1, that the configuration information includes the VTEP device identifier 001 that is the same as the device identifier of the device 1, determines that the device 1 is a VTEP, and can learn, by searching Table 1, that the device 1 corresponds to the vni 101 and the vni 102, and may establish a VXLAN tunnel to the device 2 corresponding to the vni 101 and establish a VXLAN tunnel to the device 3 corresponding to the vni 102.

TABLE 1

| VTEP device identifier | VNI |
| --- | --- |
| 001 | vni 101 and vni 102 |
| 002 | vni 101 |
| 003 | vni 102 |

In a possible implementation, the first network device includes a command line interface (CLI) module. The CLI module is used for interaction between the user and the first network device. The CLI module may be implemented in a hardware manner, or may be implemented in a manner in which a processor executes a software instruction. The first network device obtains, by using the CLI module, the configuration information input by the user. For example, the user may divide the configuration information into a plurality of pieces of information, and the first network device obtains, by using the CLI module, the information input by the user one by one.

In another possible implementation, the configuration information is stored in a network management server in a form of a file (for example, an Extensible Markup Language (XML) file or a JavaScript object notation (json) file), and the first network device includes a configurator (CFG) module. The CFG module is configured to manage and configure a configuration file. The CFG module may be implemented in a hardware manner, or may be implemented in a manner in which a processor executes a software instruction. The first network device invokes the CFG module to obtain the configuration information from the network management server.

Figure 3C:
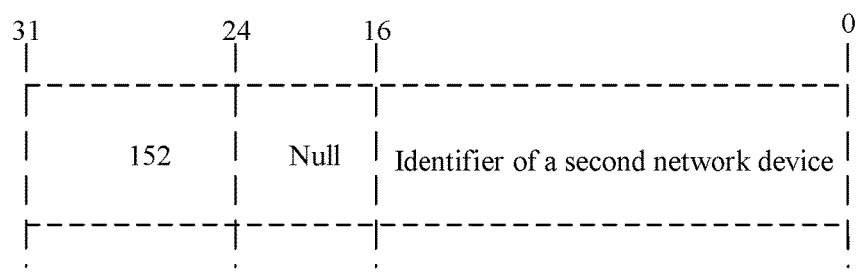
FIG. 3C is a schematic diagram of a loopback address according to an embodiment.
Figure 3D:
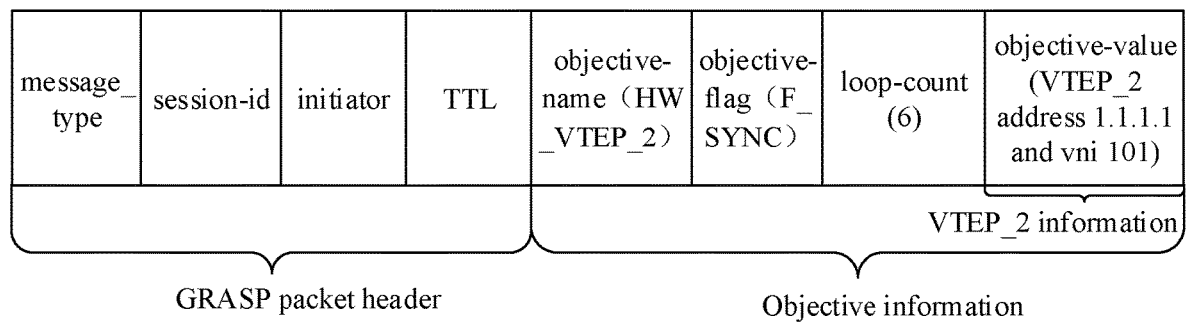
FIG. 3D is a schematic diagram of VTEP information according to an embodiment.
Figure 3E:
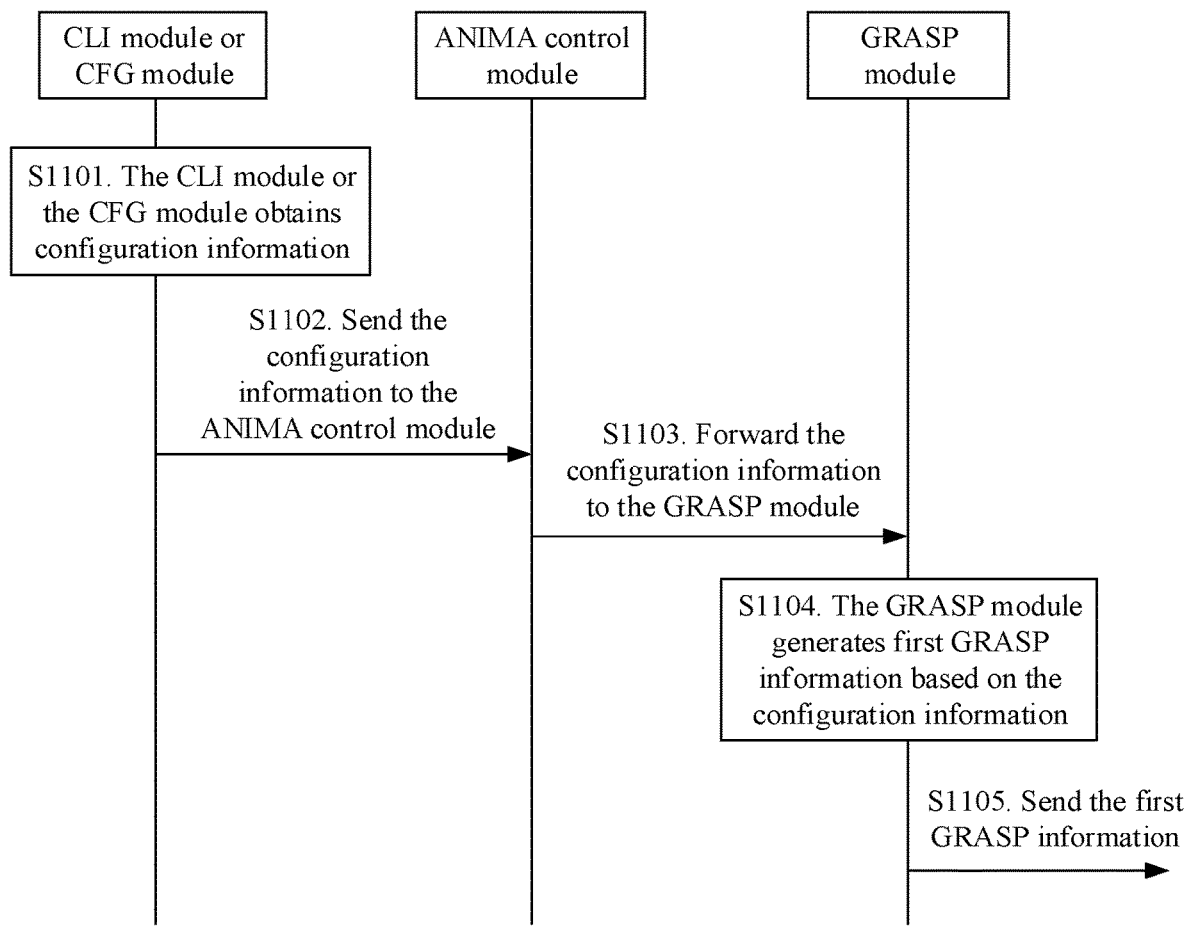
FIG. 3E is a flowchart of a method for sending first GRASP information according to an embodiment.

Specifically, for a manner in which the first network device obtains the configuration information by using the CLI module or the CFG module, refer to descriptions in FIG. 3E. Details are not described herein again.

In still another possible implementation, the configuration information is stored in a File Transfer Protocol (FTP) server in a form of a file (for example, an XML file or a j son file), and the first network device obtains the configuration information from the FTP server by using an FTP. For example, the first network device supports the FTP, the first network device sends a reload command to the FTP server, the FTP server sends the configuration information to the first network device according to the reload command, and the first network device receives the configuration information.

An example of the XML, file is as follows:

```
<VXLANIntent>
<!--VXLAN configuration segment/-->
<vxlanConfig>
<!-used configuration parameter learning object/-->
<asaObj name="specification" value="HW_VXLAN_OBJ"/>
<outerVlan name="vlanNum" value-"1001"/>
<!--list of VXLAN devices that need to be enabled/-->
<deviceList>
    <snNum name="dev1" value="001"/>
    <snNum name="dev2" value="002"/>
    <snNum name="dev3" value="003"/>
</deviceList>
</vxlanConfig>
</VXLANIntent>
```

VXLANIntent represents a VXLAN file. vxlanConfig represents a VXLAN configuration segment. asaObj name represents a name of an objective and asaObj value represents a value of the objective, namely, configuration information of the objective. For example, asaObj name="specification" value="HW_VXLAN_OBJ" indicates that the objective is a configuration parameter, and the configuration parameter is used for HW_VXLAN. outerVlan name represents a vlan that needs to be configured on a port connected to the user. outerVlan value represents a specific vlan that is the vlan that needs to be configured on the port connected to the user. For example, outerVlan name="vlanNum" value="1001" represents a vlan 1001 that needs to be configured on the port connected to the user. snNum name represents a device used as a VTEP in a VXLAN, and snNum value represents an identifier of the device used as the VTEP, in other words, indicates which device is specifically the device. For example, snNum name="dev1" value="001" identifies that the device used as the VTEP is a device 1, and a device identifier of the device 1 is 001.

An example of the json file is as follows:

```
"Virtual Service 1"=
{"VNI Range List":
    {
        {"VNI Start":10100,"VNI End":10200,"Mapping VLAN
        Start":100,"
    Mapping VLAN End":200,"GateWay IP Start":10.2.1.1,"
    Gateway IP End":10.2.101.1,"Mask Length":24}
}
"Service List":
{
    {"Service Name":user1,"Service Specificator type":VLAN,"
    Service Specificator value":1024,VXLAN Mode:1(Centralized)}
}
}
```

Virtual Service 1 identifies a virtual service 1. VNI Range List represents a VNI range list. VNI start and VNI End describe a range of a vni. Mapping VLAN Start and Mapping VLAN End describe a range of a vlan bound to the vni. GateWay IP Start and GateWay IP End describe a range of a gateway address. Mask Length describes a gateway mask. Service List represents a service list, and describes service types and VXLAN deployment modes of different VXLANs. Service Name":user1," represents a service of a user 1, Service Specificator type":VLAN," identifies that a service type is a VLAN, Service Specificator value":1024 indicates that the vlan corresponding to the service is a vlan 1024, and VXLAN Mode:1(Centralized) indicates that a deployment mode of the service is 1 (centralized deployment).

S102. The first network device generates first GRASP information based on the configuration information.

The first GRASP information may include objective information, and the objective information is used to carry the configuration information obtained by the first network device. As shown in FIG. 3B, the objective information may include an objective-name and an objective-value. The objective-name is used to identify an objective, to indicate a function of the objective. The objective-value is a configuration parameter included in the objective. For example, in this embodiment, the objective-name included in the objective information in the first GRASP information may be VXLAN configuration information (VXLAN configuration information), to indicate that the objective is used for VXLAN configuration. The objective-value may be the configuration information obtained by the first network device, and include each piece of VTEP device information. Each piece of VTEP device information includes a VTEP device identifier and a VNI corresponding to the VTEP device identifier. Each piece of VTEP device information in the objective-value may be represented in a form of Table 1 or in another manner. This is not limited.

For example, the configuration information includes VTEP_1 device information of a VTEP_1 included in the VXLAN and VTEP_2 device information of a VTEP_2 included in the VXLAN. The VTEP_1 device information includes a VTEP_1 device identifier 001 and the vni 101 corresponding to the VTEP_1 device identifier 001, and the VTEP_2 device information includes a VTEP_2 device identifier 002 and the vni 101 corresponding to the VTEP_2 device identifier 002. In this case, in the objective information that carries the configuration information, objective-name="VXLAN configuration information", and content included in the objective-value is the VTEP_1 device identifier, a value of the VTEP_1 device identifier, a vni of the VTEP_1, a value of the vni of the VTEP_1, the VTEP_2 device identifier, a value of the VTEP_2 device identifier, a vni of the VTEP_2, and a value of the VNI of the VTEP_2. The VTEP_1 device identifier corresponds to the vni of the VTEP_1, and the VTEP_2 device identifier corresponds to the vni of the VTEP_2, the correspondence may be represented in the following manner: snNum-name="VTEP_1", snNum-value="001", snNum-name="VTEP_2", snNum-value="002", vniNum-name="VTEP_1 VNI", vniNum-value="vni101", vniNum-name="VTEP_2 VNI", and vni-Num-value="vni101". snNum-name represents a device identifier, snNum-value represents a specific value of the device identifier, vniNum-name represents a VNI corresponding to a device, and vniNum-value represents a specific value of the VNI corresponding to the device.

In addition to the objective-name and the objective-value, as shown in FIG. 3B, the objective information may further include one or more of fields such as a loop-count field and an objective-flag field. The loop-count field is used to indicate a hop count for forwarding the first GRASP information. A value range of the loop-count field is from 0 to 255, including 0 and 255. The loop-count field ensures a propagation range of the first GRASP information. For example, when a value of the loop-count field is 1, the first GRASP information may be propagated to the second network device. When a value of the loop-count field is 2, the first GRASP information may be propagated to the third network device. The objective-flag is used to indicate a discovery session, a negotiation session, a synchronization session, or dry-run negotiation.

In a possible implementation, the first network device includes a GRASP component, and the first network device obtains the objective information from the configuration information by using the GRASP component, and encapsulates the obtained objective information and a GRASP packet header together to form the first GRASP information. Specifically, for a process of S102, refer to descriptions in FIG. 3E. Details are not described herein again.

As shown in FIG. 3B, the GRASP packet header may include one or more of fields such as a message type (message_type) field, a session identifier (session-id) field, an initiator field, and a time-to-live (TTL) field. It should be noted that fields shown in FIG. 3B occupy different bits, and a bit corresponding to each field may be fixed (for example, the message_type field is the first field of the GRASP information), or may be changed based on an actual requirement. For example, the TTL field is before the initiator field, or the initiator field is before the TTL field. This is not limited.

The message_type field is used to indicate a type of the first GRASP information, and specifically indicates a specific mechanism (a discovery mechanism, a synchronization mechanism, a negotiation mechanism, or a flooding mechanism) in which the objective information carried in the first GRASP information is used. For example, if the message_type field is M_DISCOVERY, it indicates that the objective information is used in the discovery mechanism.

The session-id field is an identifier of a GRASP session.

The initiator field refers to an initiator of the GRASP information, for example, the first network device.

The TTL field is used to indicate a time to live of the objective information carried in the first GRASP information in a network device. The TTL field is 32 bits long and ranges from 0 milliseconds (ms) to 4294967295 ms.

S103. The first network device sends the first GRASP information to the second network device.

The second network device may also be a PE located in the core network, and the PE may be a router or a switch, or may be an NVE device that is integrated into a router in the VXLAN or independently exists in the VXLAN, or may be a VTEP integrated into an NVE device. This is not limited.

In this embodiment, the second network device may be considered as an independent network device, or may be considered as a plurality of network devices. When the second network device is considered as a plurality of network devices, that the first network device sends the first GRASP information to the second network device may mean that the first network device simultaneously sends the first GRASP information to the plurality of network devices.

In a possible implementation, the first network device runs an ANIMA function, configures an ANIMA domain, and floods the first GRASP information to all network devices in the ANIMA domain by using a GRASP. The ANIMA domain includes the second network device, and may further include another network device, for example, the third network device or a fourth network device. Specifically, for a process of S103, refer to descriptions in FIG. 3E. Details are not described herein again.

S104. The second network device receives the first GRASP information sent by the first network device.

S105. When the second network device determines that a device identifier of the second network device is the same as a second VTEP device identifier included in second VTEP device information, the second network device determines that the second network device is a second VTEP, where the second VTEP device information is used to indicate the second VTEP.

After receiving the first GRASP information, the second network device may decapsulate the first GRASP information to obtain the configuration information included in the first GRASP information, view the VTEP device identifier included in each piece of VTEP device information, and compare the VTEP device identifier with the device identifier of the second network device. If there is the device identifier that is the same as the device identifier of the second network device, the second network device determines that the second network device is the VTEP, and may establish a VXLAN tunnel to a peer VTEP.

For example, if the device identifier of the second network device is 002, and a VTEP device identifier of a VTEP_2 in the configuration information is 002, it is determined that the second network device is the VTEP_2. It may be understood that when the configuration information includes no VTEP device identifier that is the same as the device identifier of the second network device, it means that the second network device cannot be used as a VTEP, and the following steps S106 and S107 are not performed.

S106. The second network device generates second VTEP information based on the second VTEP device information, where the second VTEP device information further includes a second VNI corresponding to the second VTEP device identifier, the second VTEP information includes a second VTEP address and the second VNI, and the second VTEP address is bound to the second VNI.

That the second network device generates second VTEP information based on the second VTEP device information may include: after the second network device determines that the second network device is the VTEP, determining the second VTEP address, and combining the second VTEP address and the second VNI into the second VTEP information.

The second VTEP address may be a network address that can be used to implement routing to the second VTEP, and the second VTEP address may be a loopback address of the second VTEP, an IP address of a physical interface of the second VTEP, or the like. This is not limited.

In a possible implementation, the second VTEP device information further includes a second loopback address, and the second loopback address corresponds to the second VTEP device identifier. When the second network device determines that the second network device is the second VTEP, the second network device determines the second loopback address as the second VTEP address.

In another possible implementation, when the second network device determines that the second network device is the second VTEP, the second network device generates a second loopback address according to a loopback address generation rule, and determines the generated second loopback address as the second VTEP address. The second loopback address includes an identifier of the second network device, a reserved bit, and a fixed value. Specifically, as shown in FIG. 3C, the second loopback address includes 32 bits. The $0^{th}$ bit to the $16^{th}$ bit (including the $0^{th}$ bit and the $16^{th}$ bit) are filled with the identifier of the second network device, the $16^{th}$ bit to the $24^{th}$ bit (excluding the $16^{th}$ bit but including the $24^{th}$ bit) are reserved bits and are all filled with a number 0, and the $24^{th}$ bit to the $31^{st}$ bit (excluding the $24^{th}$ bit but including the $31^{st}$ bit) are filled with a fixed value. Usually, the fixed value may be 152 shown in FIG. 3C.

In still another possible implementation, the second VTEP device information further includes a value range and a rule of an IP address of a physical interface of the second VTEP, the physical interface of the second VTEP corresponds to the second VTEP device identifier, and the value range and the rule of the IP address of the physical interface of the second VTEP may be used to specify a specific manner of configuring the IP address of the physical interface of the second VTEP and an address range corresponding to the configured IP address of the physical interface. When the second network device determines that the second network device is the second VTEP, the second network device determines the IP address of the physical interface of the second VTEP according to the value range and the rule of the IP address of the physical interface of the second VTEP, and determines the IP address of the physical interface of the second VTEP as the second VTEP address.

In yet another possible implementation, when the second network device determines that the second network device is the second VTEP, the second network device configures ipv6 auto-link local on a physical interface. After the configuration, the physical interface generates a random ipv6 address according to a method described in Internet Engineering Task Force (IETF) request for comments (RFC) 7217, and the generated ipv6 address is determined as the second VTEP address.

S107. The second network device sends second GRASP information to the third network device, where the second GRASP information includes the second VTEP information, and the second GRASP information is used to trigger the third network device to establish a VXLAN tunnel based on the second GRASP information.

The third network device may be the first network device, or may be another network device other than the first network device and the second network device. This is not limited. When the third network device is the first network device, it indicates that the first network device is one of VTEPs, and the first network device may perform S101 to obtain the configuration information, and may further create a VXLAN tunnel between the first network device and the second network device based on the second GRASP information.

The second network device may add the second VTEP information to objective information, and encapsulate the objective information and a GRASP packet header together to generate the second GRASP information. For example, the objective information that carries the second VTEP information may include an objective-name and an objective-value. The objective-name may be used to identify an objective, the objective may be the second VTEP information, the objective-name may be a type of the second VTEP information, and the objective-value may include a configuration parameter of the objective, for example, may include the second VTEP address in the second VTEP information and the VNI bound to the second VTEP address.

It should be noted that, in addition to carrying the second VTEP information, the objective information that carries the second VTEP information may further include fields such as a loop-count field and an objective-flag field. The GRASP packet header in the second GRASP information may include one or more of fields such as a message_type field, a session-id field, an initiator field, and a TTL field. Specifically, for descriptions of the fields included in the second GRASP information, refer to the foregoing related descriptions of the fields included in the first GRASP information. Details are not described herein again.

For example, if the second network device is a VTEP_2, an address of the second network device is a loopback address 1.1.1.1, a VNI bound to the address is a vni 101, VTEP_2 information sent by the second network device is HW_VTEP_2, the objective-flag field is F_SYNC, and the loop-count field is 6, the second GRASP information generated by the second network device is shown in FIG. 3D. It should be noted that an example in which the address of the second network device is bound to only one VNI is used for description in FIG. 3D. In actual application, the address of the second network device may be bound to a plurality of VNIs. This is not limited.

For a process in which the second network device sends the second GRASP information to the third network device, refer to the related description in S103. For example, the second network device may also send the second GRASP information to the third network device in a flooding manner. Details are not described herein again.

Based on the solution shown in FIG. 3A, the first network device may obtain the configuration information used to indicate the plurality of VTEPs included in the VXLAN, add the configuration information to the first GRASP information, and send the first GRASP information to the second network device. The second network device may determine, based on the configuration information included in the first GRASP information, that the second network device is the second VTEP, generate the second VTEP information based on the second VTEP device information, add the second VTEP information to the second GRASP information, and send the second GRASP information to the third network device, so that the third network device creates the VXLAN tunnel based on the second GRASP information. In this way, VXLAN configuration is completed by exchanging information between network devices, so that automatic VXLAN configuration is implemented, and existing problems of low VXLAN configuration efficiency and a relatively high error rate are avoided.

Optionally, in the solution shown in FIG. 3A, if the third network device is the first network device, the first network device determines that the first network device is a first VTEP, and that the first network device establishes a VXLAN tunnel based on the second GRASP information includes: receiving, by the first network device, the second GRASP information sent by the second network device; and establishing, by the first network device, the VXLAN tunnel from the first network device to the second network device based on first VTEP information and the second VTEP information when the first network device determines that a first VNI is the same as the second VNI, where first VTEP device information includes the first VNI, the first VNI corresponds to a first VTEP device identifier, and the first VTEP device information is used to indicate the first VTEP.

A process in which the first network device determines that the first network device is the first VTEP is as follows: When the first VTEP device identifier included in the first VTEP device information in the configuration information is the same as a device identifier of the first network device, the first network device determines that the first network device is the first VTEP.

The first VTEP information may include the first VNI and a first VTEP address, and the first VTEP address is bound to the first VNI. For a manner of determining the first VTEP address, refer to the foregoing manner of determining the second VTEP address. Details are not described herein again.

Specifically, the establishing, by the first network device, the VXLAN tunnel from the first network device to the second network device based on first VTEP information and the second VTEP information includes: creating, by the first network device, a peer list corresponding to the first VNI, where the peer list corresponding to the first VNI may include an address of the first network device.

For example, the second VTEP information includes information such as the second VTEP address 1.1.1.1 and the vni 101. When receiving the second VTEP information, if the first network device finds that the second VTEP information includes the vni 101 that is the same as a VNI of the first network device, the first network device creates a peer list corresponding to the vni 101. The peer list includes the second VTEP address 1.1.1.1. Specifically, a creation process of the peer list is as follows:

```

    source 2.2.2.2 //configure an IP address of a source VTEP
    vni 101 head-end peer-list 1.1.1.1

```

The source VTEP is the first network device. In this way, the local VTEP (the first network device) can learn that a peer VTEP corresponding to the vni 101 is 1.1.1.1. When receiving a packet from the vni 101, the local VTEP sends the packet to the peer VTEP 1.1.1.1 through a VXLAN tunnel.

Because VXLAN tunnel creation is a mutual process, to enable the second network device to create a VXLAN tunnel from the second network device to the third network device, after the first network device determines that the first network device is the first VTEP, the first network device generates the first VTEP information, and sends, to the second network device, third GRASP information that carries the first VTEP information. The second network device receives the third GRASP information sent by the first network device, and when the second network device determines that the second VNI is the same as the first VNI, the second network device establishes the VXLAN tunnel from the second network device to the third network device based on the second VTEP information and the first VTEP information.

For a process in which the second network device establishes a VXLAN tunnel from the second network device to the first network device based on the second VTEP information and the first VTEP information, refer to the foregoing process in which the first network device establishes the VXLAN tunnel from the first network device to the second network device based on the first VTEP information and the second VTEP information. Details are not described herein again.

Still using an example in which the second VTEP information includes information such as the second VTEP address 1.1.1.1 and the vni 101, and the first VTEP information includes information such as the first VTEP address 2.2.2.2 and the vni 101, a process in which the second network device establishes the VXLAN tunnel is as follows:

```

    source 1.1.1.1 //configure an IP address of a source VTEP
    vni 101 head-end peer-list 2.2.2.2

```

The source VTEP is the second network device. In this way, the local VTEP (the second network device) can learn that a peer VTEP corresponding to the vni 101 is 2.2.2.2. When receiving a packet from the vni 101, the local VTEP sends the packet to the peer VTEP 2.2.2.2 through a VXLAN tunnel.

It should be noted that, in actual application, if the third network device is the first network device, the third network device may directly obtain the configuration information in S101. If the third network device is another network device other than the first network device and the second network device, the third network device may receive, like the second network device, the first GRASP information that is sent by the first network device and that carries the configuration information, or the second network device serves as a relay node and the second network device forwards the first GRASP information to the third network device. In other words, the third network device receives the first GRASP information forwarded by the second network device. This is not limited.

Optionally, the VTEP device information further includes a VTEP access-side port identifier, and the VTEP access-side port identifier corresponds to the VTEP device identifier. The solution shown in FIG. 3A further includes: determining, by the first network device based on the first VTEP access-side port identifier included in the first VTEP device information, a layer 2 sub-interface of the first network device and a first BD corresponding to the layer 2 sub-interface, where the first VTEP access-side port identifier corresponds to the first VTEP device identifier, the layer 2 sub-interface is configured to connect to a VM, and the first VNI is used to indicate that the VM belongs to the first BD.

In this way, after establishing a VXLAN tunnel to another network device, the first network device may determine a layer 2 sub-interface of the first network device and a BD corresponding to a VM connected to the layer 2 sub-interface, so that VLAN information of the VM is converted into information identified by a VNI, and the information is sent through the VXLAN tunnel.

The VTEP access-side port identifier is used to identify an access-side port of the VTEP, and the VTEP access-side port identifier may be an index number of the access-side port of the VTEP. For example, access-side ports of the VTEP may be numbered by using index numbers 1 to n, and n is an integer greater than or equal to 2. Alternatively, the VTEP access-side port identifier may be a physical address, for example, an Ethernet address, of the access-side port of the VTEP. This is not limited.

For example, an access-side port of the first network device is 10GE1/0/1, and VNIs corresponding to the first network device are a vni 4000 and a vni 5000. Layer 2 sub-interfaces 10GE1/0/1.1 and 10GE1/0/1.2 are separately created based on the access-side port 10GE1/0/1, the layer 2 sub-interface 10GE1/0/1.1 is added to a BD broadcast domain 10, the vni 4000 is configured for the BD broadcast domain 10, the layer 2 sub-interface 10GE1/0/1.2 is added to a BD broadcast domain 20, and the vni 5000 is configured for the BD broadcast domain 20. The configurations are as follows:

```

    interface 10GE1/0/1.1 mode l2 //create a layer 2 sub-interface
    10GE1/0/1.1
        bridge-domain 10 //indicate creation of a "large layer 2
broadcast domain" BD whose number is 10
        vxlan vni 4000 //indicate that, in a BD broadcast domain 10,
a vni 4000 is specified as a VNI associated with the BD broadcast
domain 10
    #
    interface 10GE1/0/1.2 mode l2 //create a layer 2 sub-interface
    10GE1/0/1.2
        bridge-domain 20 //indicate creation of a "large layer 2
broadcast domain" BD whose number is 20
        vxlan vni 5000 //indicate that, in a BD broadcast domain 20,
a vni 5000 is specified as a VNI associated with the BD broadcast
domain 20
    #
```

Further, optionally, the configuration information obtained by the first network device further includes a routing protocol used by a network. The routing protocol includes a protocol such as an open shortest path first (OSPF) protocol or an Intermediate System to Intermediate System (ISIS) protocol. The routing protocol is used by the user to select a specific routing protocol, for example, the OSPF protocol or another routing protocol such as the ISIS protocol, during route advertisement between devices.

The following uses FIG. 3E as an example to describe a process in which the first network device generates the first GRASP information and sends the second GRASP information to the second network device. As shown in FIG. 3E, the first network device may include an ANIMA control module and a GRASP module. The ANIMA control module is configured to manage and schedule another module in the first network device. The GRASP module is configured to implement a GRASP function. In this embodiment, the GRASP module is further configured to generate and send the first GRASP information. The first network device may further include a CFG module and/or a CLI module. The CFG module is configured to manage and configure a configuration file. The CLI module is configured to perform interaction between the user and the first network device. The ANIMA control module, the GRASP module, the CFG module, and the CLI module may be implemented in a hardware manner, or may be implemented in a manner in which a processor executes a software instruction. A method shown in FIG. 3E includes S1101 to S1105.

S1101. The CLI module or the CFG module obtains the configuration information.

The first network device may obtain the configuration information by using the CLI module or the CFG module. For example, the user inputs the configuration information by using the CLI module. For another example, based on a configuration request of the user, the ANIMA control module invokes the CFG module to configure the configuration information. In this way, the CFG module can obtain the configuration information.

S1102. The CLI module or the CFG module sends the configuration information to the ANIMA control module.

The CLI module or the CFG module may directly send the configuration information to the ANIMA control module, or send a first message to the ANIMA control module after adding the configuration information to the first message. A format of the first message may be a message transmission format inside the network device, for example, a socket message.

S1103. The ANIMA control module forwards the configuration information to the GRASP module.

The ANIMA control module may forward the received configuration information to the GRASP module, or forward the received first message to the GRASP module.

S1104. The GRASP module generates the first GRASP information based on the configuration information.

Specifically, the GRASP module may encapsulate the configuration information into the first GRASP information in the format shown in FIG. 3B.

S1105. The GRASP module sends the first GRASP information.

According to the foregoing description, the ANIMA control module is configured to manage and schedule the another module in the first network device. After receiving the configuration information, the ANIMA control module sends the configuration information to the GRASP module. After receiving the configuration information, the GRASP module may generate the first GRASP information by using the configuration information. Then, the GRASP module sends the first GRASP information to the second network device. For a specific implementation of a packet of the first GRASP information, refer to FIG. 3B.

S1101 to S1105 describe an implementation in which the CLI module or the CFG module actively reports the configuration information to the GRASP module by using the ANIMA control module. In another implementation, the GRASP module may actively request the ANIMA control module, to inquire about the configuration information from the ANIMA control module. The ANIMA control module invokes the CLI module or the CFG module for reporting. For a process in which the CLI module or the CFG module performs reporting, refer to the descriptions of S1101 to S1105. Details are not described herein again.

The technical solutions provided are described below in detail by using an example in which a device identifier of a network device 1 is a management device (which is mainly responsible for sending configuration information), the device identifier of the network device 1 is 001, a device identifier of a network device 2 is 002, the network device 1 and the network device 2 are respectively used as a VTEP_1 and a VTEP_2, and a VXLAN tunnel is established between the VTEP_1 and the VTEP_2.

Figure 4:
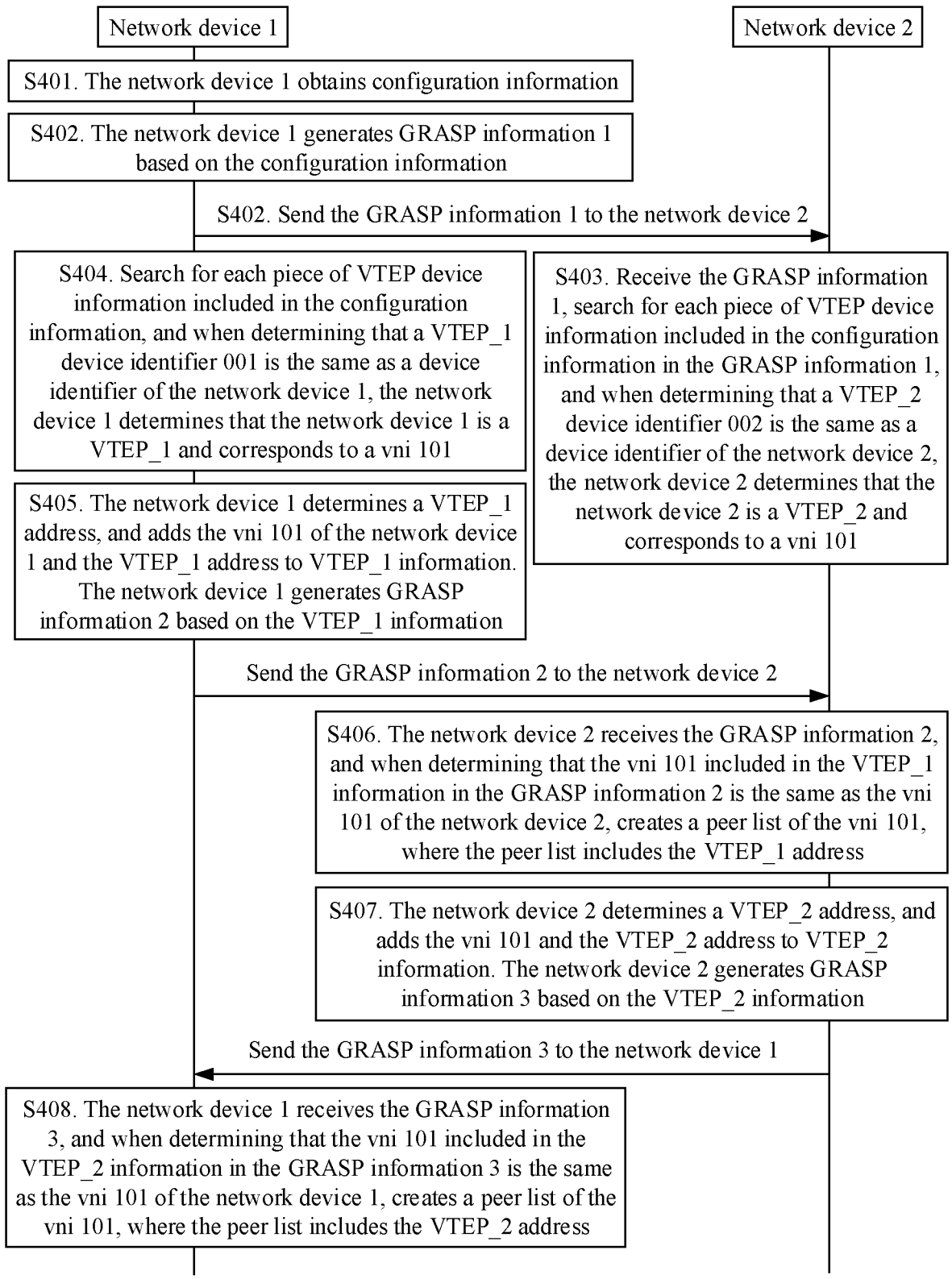
FIG. 4 is a flowchart of another VXLAN configuration method according to an embodiment.

FIG. 4 is a flowchart of another VXLAN configuration method according to an embodiment. As shown in FIG. 4, the method includes the following steps.

S401. The network device 1 obtains the configuration information, where the configuration information includes VTEP_1 device information and VTEP_2 device information, the VTEP_1 device information is used to indicate the VTEP_1 in a VXLAN, the VTEP_1 device information includes a VTEP_1 device identifier 001 and a vni 101 corresponding to the VTEP_1 device identifier 001, the VTEP_2 device information is used to indicate the VTEP_2 in the VXLAN, and the VTEP_2 device information includes a VTEP_2 device identifier 002 and a vni 101 corresponding to the VTEP_2 device identifier 002.

For a process in which the network device 1 obtains the configuration information, refer to the foregoing process in which the first network device obtains the configuration information in S101. Details are not described herein again.

S402. The network device 1 generates GRASP information 1 based on the configuration information, and sends the GRASP information 1 to the network device 2.

The GRASP information 1 includes information such as a GRASP packet header, the VTEP_1 device identifier 001, the vni 101 corresponding to the VTEP_1 device identifier 001, the VTEP_2 device identifier 002, and the vni 101 corresponding to the VTEP_2 device identifier 002. Specifically, for a process in which the network device 1 generates the GRASP information 1 and sends the GRASP information 1, refer to the foregoing process in which the first network device generates the first GRASP information and sends the first GRASP information. Details are not described herein again.

S403. The network device 2 receives the GRASP information 1 and searches for each piece of VTEP device information included in the configuration information in the GRASP information 1, and when determining that the VTEP_2 device identifier 002 is the same as the device identifier of the network device 2, the network device 2 determines that the network device 2 is the VTEP_2 and corresponds to the vni 101.

S404. The network device 1 searches for each piece of VTEP device information included in the configuration information, and when determining that the VTEP_1 device identifier 001 is the same as the device identifier of the network device 1, the network device 1 determines that the network device 1 is the VTEP_1 and corresponds to the vni 101.

S405. The network device 1 determines a VTEP_1 address, and adds the vni 101 of the network device 1 and the VTEP_1 address to VTEP_1 information. The network device 1 generates GRASP information 2 based on the VTEP_1 information, and sends the GRASP information 2 to the network device 2.

For a process in which the network device 1 determines the VTEP_1 address, refer to the foregoing process in which the first network device determines the first VTEP address. Details are not described herein again.

That the network device 1 generates GRASP information 2 based on the VTEP_1 information may include: adding, by the network device 1, the VTEP_1 information to objective information, and encapsulating the objective information and a GRASP packet header together to generate the GRASP information 2.

S406. The network device 2 receives the GRASP information 2, and when determining that the vni 101 included in the VTEP_1 information in the GRASP information 2 is the same as the vni 101 of the network device 2, creates a peer list of the vni 101, where the peer list includes the VTEP_1 address. In this way, a VXLAN tunnel from the network device 2 to the network device 1 is established.

S407. The network device 2 determines a VTEP_2 address, and adds the vni 101 and the VTEP_2 address to VTEP_2 information. The network device 2 generates GRASP information 3 based on the VTEP_2 information, and sends the GRASP information 3 to the network device 1.

For a process in which the network device 2 determines the VTEP_2 address, refer to the foregoing process in which the second network device determines the second VTEP address. Details are not described herein again.

That the network device 2 generates GRASP information 3 based on the VTEP_2 information may include: adding, by the network device 2, the VTEP_2 information to objective information, and encapsulating the objective information and a GRASP packet header together to generate the GRASP information 3.

S408. The network device 1 receives the GRASP information 3, and when determining that the vni 101 included in the VTEP_2 information in the GRASP information 3 is the same as the vni 101 of the network device 1, creates a peer list of the vni 101, where the peer list includes the VTEP_2 address. In this way, a VXLAN tunnel from the network device 1 to the network device 2 is established.

It should be noted that, in a possible implementation, S405 and S406, and S407 and S408 are simultaneously performed, or S405 and S406 are performed before S407 and S408, or S407 and S408 are performed before S405 and S406. This is not limited. In addition, S402 and S403 may be performed together with S405, or may be performed between S405 and S406. This is not limited.

Figure 5:
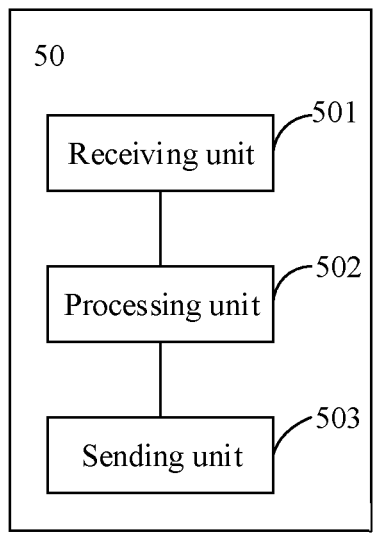
FIG. 5 is a schematic structural diagram of a first network device according to an embodiment.

FIG. 5 is a schematic structural diagram of a first network device 50 according to an embodiment. The first network device 50 shown in FIG. 5 runs an ANIMA protocol, and the first network device 50 may perform corresponding steps performed by the first network device in the method in the foregoing embodiment. As shown in FIG. 5, the first network device 50 includes a receiving unit 501, a processing unit 502, and a sending unit 503.

The receiving unit 501 is configured to obtain configuration information, where the configuration information includes a plurality of pieces of VTEP device information, and the plurality of pieces of VTEP device information are respectively used to indicate a plurality of VTEPs included in a VXLAN.

The processing unit 502 is configured to generate first GRASP information based on the configuration information obtained by the receiving unit 501, where the first GRASP information includes objective information, and the objective information is used to carry the configuration information.

The sending unit 503 is configured to send the first GRASP information generated by the processing unit 502 to a second network device, where the first GRASP information is used to trigger the second network device to establish a VXLAN tunnel based on the first GRASP information.

Optionally, each of the plurality of pieces of VTEP device information includes a VTEP device identifier and a VXLAN network identifier VNI, and the VTEP device identifier corresponds to the VNI. When the processing unit 502 determines that a device identifier of the first network device is the same as a first VTEP device identifier included in first VTEP device information, the processing unit 502 determines that the first network device is a first VTEP, where the first VTEP device information is used to indicate the first VTEP. The processing unit 502 is further configured to generate first VTEP information based on the first VTEP device information, where the first VTEP device information further includes a first VNI corresponding to the first VTEP device identifier, the first VTEP information includes a first VTEP address and the first VNI, and the first VTEP address is bound to the first VNI. The sending unit 503 is further configured to send second GRASP information to the second network device, where the second GRASP information includes the first VTEP information.

Optionally, the receiving unit 501 is further configured to receive third GRASP information sent by the second network device, where the third GRASP information includes second VTEP information, the second VTEP information includes a second VTEP address and a second VNI, and the second VTEP address is bound to the second VNI; and the processing unit 502 is further configured to establish a VXLAN tunnel from the first network device to the second network device based on the first VTEP information and the second VTEP information when the processing unit 502 determines that the first VNI is the same as the second VNI.

Optionally, each of the plurality of pieces of VTEP device information further includes a VTEP access-side port identifier, the VTEP access-side port identifier corresponds to the VTEP device identifier, and the processing unit 502 is further configured to determine, based on a first VTEP access-side port identifier included in the first VTEP device information, a layer 2 sub-interface of the first network device and a first BD corresponding to the layer 2 sub-interface, where the first VTEP access-side port identifier corresponds to the first VTEP device identifier, the layer 2 sub-interface is configured to connect to a virtual machine VM, and the first VNI is used to indicate that the VM belongs to the first BD.

Optionally, the first VTEP device information further includes a first loopback address, the first loopback address corresponds to the first VTEP device identifier, and that the processing unit 502 generates first VTEP information based on the first VTEP device information specifically includes: the processing unit 502 is further configured to determine the first loopback address as the first VTEP address.

The first network device shown in FIG. 5 may perform the corresponding steps performed by the first network device in the method in the foregoing embodiment. Automatic VXLAN configuration is implemented, and existing problems of low VXLAN configuration efficiency and a high configuration error rate are avoided.

Figure 6:
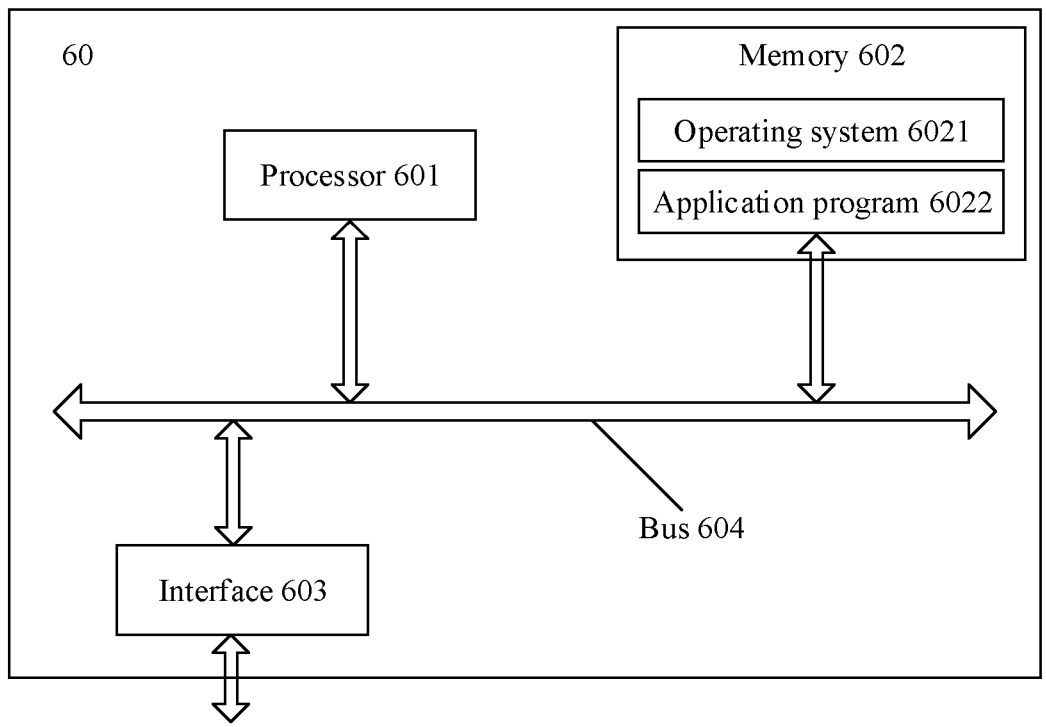
FIG. 6 is a schematic diagram of a hardware structure of a first network device according to an embodiment.

FIG. 6 is a schematic diagram of a hardware structure of a first network device 60 according to an embodiment. The first network device 60 shown in FIG. 6 may perform corresponding steps performed by the first network device in the method in the foregoing embodiment.

As shown in FIG. 6, the first network device 60 includes a processor 601, a memory 602, an interface 603, and a bus 604. The interface 603 may be implemented in a wireless or wired manner, and may be specifically a network adapter. The processor 601, the memory 602, and the interface 603 are connected by using the bus 604.

The interface 603 may specifically include a transmitter and a receiver, and is used by the first network device to receive information from and send information to the second network device in the foregoing embodiment. For example, the interface 603 is configured to support to obtain configuration information and send first GRASP information to the second network device. For example, the interface 603 is configured to support the processes S101 and S103 in FIG. 3A. The processor 601 is configured to perform processing performed by the first network device in the foregoing embodiment. For example, the processor 601 is configured to: generate the first GRASP information, and/or perform another process used in the technology described in this specification. For example, the processor 601 is configured to support the process S102 in FIG. 3A. The memory 602 includes an operating system 6021 and an application program 6022, and is configured to store a program, code, or an instruction. When executing the program, code, or instruction, the processor or a hardware device may complete a processing process related to the first network device in the method embodiment. Optionally, the memory 602 may include a read-only memory (ROM) and a random-access memory (RAM). The ROM includes a basic input/output system (BIOS) or an embedded system, and the RAM includes the application program and the operating system. When the first network device 60 needs to run, a bootloader in the BIOS or the embedded system that is built into the ROM is used to boot a system to start, and boot the first network device 60 to enter a normal running state. After entering the normal running state, the first network device 60 runs the application program and the operating system in the RAM, to complete the processing process related to the first network device in the method embodiment.

It may be understood that FIG. 6 shows merely a simplified design of the first network device 60. In actual application, the first network device may include any quantity of interfaces, processors, or memories.

Figure 7:
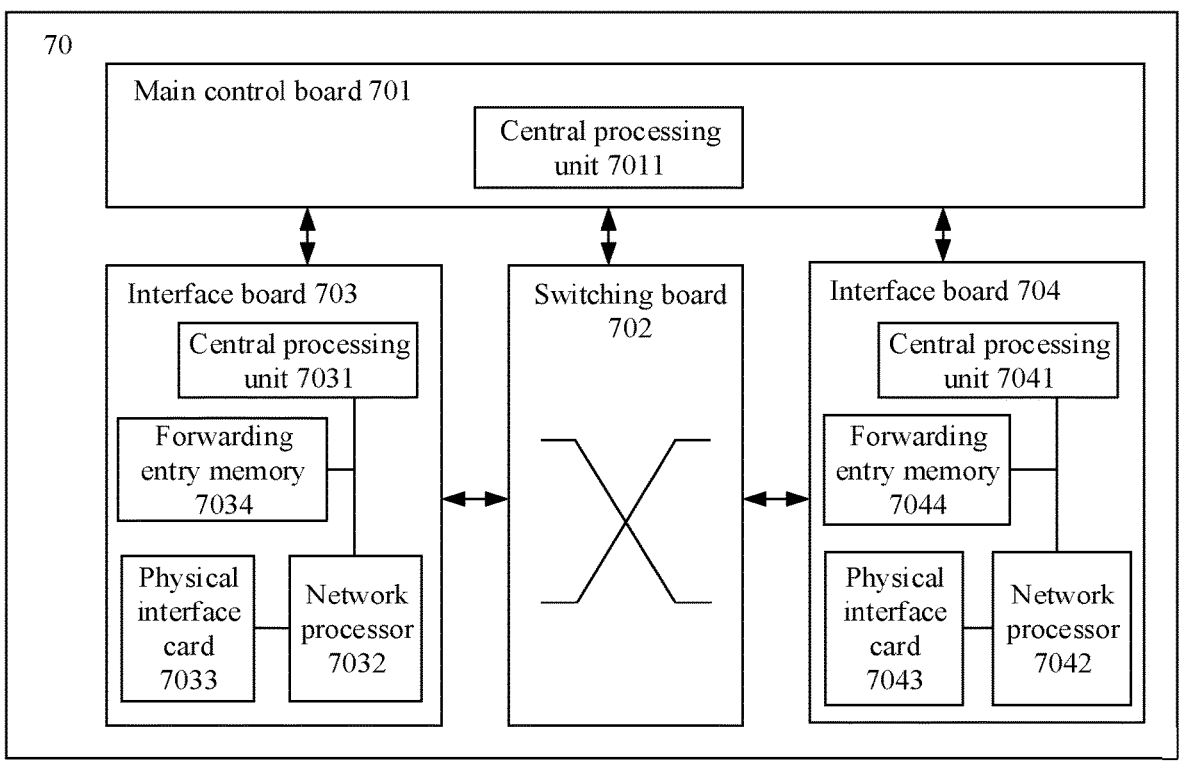
FIG. 7 is a schematic diagram of a hardware structure of another first network device according to an embodiment.

FIG. 7 is a schematic diagram of a hardware structure of another first network device 70 according to an embodiment. The first network device 70 shown in FIG. 7 may perform corresponding steps performed by the first network device in the method in the foregoing embodiment.

As shown in FIG. 7, the first network device 70 includes a main control board 701, a switching board 702, an interface board 703, and an interface board 704. The main control board 701, the interface board 703 and the interface board 704, and the switching board 702 are connected to a system backboard by using a system bus for interworking. The main control board 701 is configured to complete functions such as system management, device maintenance, and protocol processing. The switching board 702 is configured to complete data exchange between interface boards (the interface board is also referred to as a line card or a service board). The interface board 703 and the interface board 704 are configured to: provide various service interfaces (for example, a POS interface, a GE interface, and an ATM interface); and forward a data packet.

The interface board 703 may include a central processing unit 7031, a forwarding entry memory 7034, a physical interface card 7033, and a network processor 7032. The central processing unit 7031 is configured to: control and manage the interface board, and communicate with a central processing unit on the main control board. The forwarding entry memory 7034 is configured to store a forwarding entry. The physical interface card 7033 is configured to receive and send traffic. The network processor 7032 is configured to control, based on the forwarding entry, the physical interface card 7033 to receive and send the traffic.

Specifically, the physical interface card 7033 receives configuration information, and sends the configuration information to the central processing unit 7011 on the main control board 701 by using the central processing unit 7031.

The central processing unit 7011 is configured to: obtain the configuration information, and generate first GRASP information based on the configuration information. The physical interface card 7033 is further configured to forward the first GRASP information to the second network device.

When determining that a device identifier of the first network device is the same as a first VTEP device identifier included in first VTEP device information, the central processing unit 7011 is further configured to: determine that the first network device is a first VTEP, and generate first VTEP information based on the first VTEP device information. The physical interface card 7033 is further configured to send second GRASP information to the second network device, and the second GRASP information includes the first VTEP information.

The physical interface card 7033 is further configured to receive third GRASP information sent by the second network device, where the third GRASP information includes second VTEP information, the second VTEP information includes a second VTEP address and a second VNI, and the second VTEP address is bound to the second VNI; and the central processing unit 7011 is further configured to establish a VXLAN tunnel from the first network device to the second network device based on the first VTEP information and the second VTEP information when the central processing unit 7011 determines that the first VNI is the same as the second VNI.

The central processing unit 7011 is further configured to determine, based on a first VTEP access-side port identifier included in the first VTEP device information, a layer 2 sub-interface of the first network device and a first BD corresponding to the layer 2 sub-interface, where the first VTEP access-side port identifier corresponds to the first VTEP device identifier, the layer 2 sub-interface is configured to connect to a virtual machine VM, and the first VNI is used to indicate that the VM belongs to the first BD.

The first VTEP device information further includes a first loopback address, the first loopback address corresponds to the first VTEP device identifier, and the central processing unit 7011 is further configured to determine the first loopback address as the first VTEP address.

It should be understood that operations on the interface board 704 are consistent with the operations on the interface board 703 in this embodiment. For brevity, details are not described again. It should be understood that the first network device 70 in this embodiment may correspond to the functions and/or the various implemented steps in the foregoing method embodiment. Details are not described herein again. In addition, only the first network device is used as an example for description in this embodiment. It should be understood that the second network device has, or more network devices have, a same function as the first network device. Details are not described herein again.

In addition, it should be noted that there may be one or more main control boards. When there are a plurality of main control boards, a primary main control board and a secondary main control board may be included. There may be one or more interface boards, and the first network device with a stronger data processing capability provides more interface boards. There may also be one or more physical interface cards on the interface board. There may be no switching board or one or more switching boards. When there are a plurality of switching boards, load sharing and redundancy backup may be implemented together. In a centralized forwarding architecture, the first network device may need no switching board, and the interface board provides a function of processing service data in an entire system. In a distributed forwarding architecture, the first network device may have at least one switching board, and exchange data between a plurality of interface boards by using the switching board, to provide a large-capacity data exchange and processing capability. Therefore, a data access and processing capability of the first network device in the distributed architecture is better than that of the device in the centralized architecture. Which architecture is specifically used depends on a specific networking deployment scenario, and is not limited herein.

Figure 8:
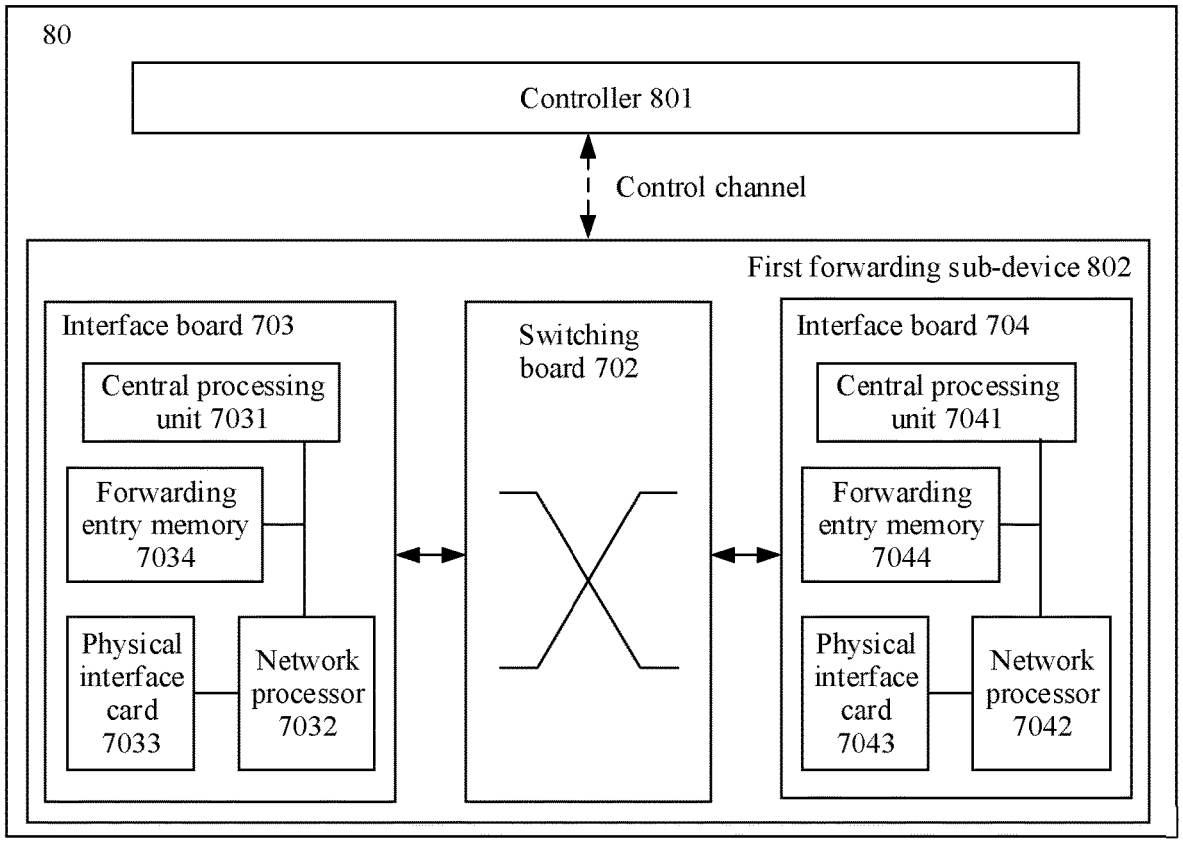
FIG. 8 is a schematic diagram of a hardware structure of still another first network device according to an embodiment.

FIG. 8 is a schematic diagram of a hardware structure of still another first network device 80 according to an embodiment. The first network device 80 shown in FIG. 8 may perform corresponding steps performed by the first network device in the method in the foregoing embodiment.

This product form of the first network device 80 is applicable to a network architecture (for example, software-defined networking (SDN)) based on separation of control and forwarding. In the SDN, the main control board 701 of the first network device 70 shown in FIG. 7 is separated from the device, to form a new independent physical device (namely, a controller 801 shown in FIG. 8), and the remaining components form another independent physical device (namely, a first forwarding sub-device 802 shown in FIG. 8). The controller 801 interacts with the first forwarding sub-device 802 by using a control channel protocol. The control channel protocol may be the OpenFlow protocol, the Path Computation Element Communication Protocol (PCEP), the Border Gateway Protocol (BGP), the Interface to the Routing System (I2RS) protocol, or the like. In other words, compared with that in the embodiment corresponding to FIG. 7, the first network device 80 in this embodiment includes the separated controller 801 and the first forwarding sub-device 802.

The controller 801 may be implemented based on a general-purpose physical server or a dedicated hardware structure. In a design example, the controller includes a receiver, a processor, a transmitter, a RAM, a ROM, and a bus (not shown in the figure). The processor is coupled to the receiver, the transmitter, the RAM, and the ROM by using the bus. When the controller needs to run, a bootloader in a BIOS or an embedded system that is built into the ROM is used to boot a system to start, and boot the controller to enter a normal running state. After entering the normal running state, the controller runs an application program and an operating system in the RAM, to enable the processor to perform all functions and steps of the main control board 701 in FIG. 7.

The first forwarding sub-device 802 may be implemented based on a dedicated hardware structure. A function and a structure of the first forwarding sub-device 802 is consistent with functions and structures of the interface board 703, the interface board 704, and the switching board 702 in FIG. 7, to perform corresponding functions and steps. Alternatively, the first forwarding sub-device 802 may be a virtual first forwarding sub-device implemented based on a general-purpose physical server and a network functions virtualization (NFV) technology, and the virtual first forwarding sub-device is a virtual router. In a scenario of the virtual first forwarding sub-device, the interface board, the switching board, and the processor that are included in the first forwarding sub-device in the embodiment of the physical first forwarding sub-device may be considered as an interface resource, a network resource, and a processing resource that are allocated by the first forwarding sub-device to the virtual first forwarding sub-device for use based on a general-purpose physical server in a virtual environment. For details of implementing functions or steps of the first forwarding sub-device by using the general-purpose physical server, or implementing functions or steps of the first forwarding sub-device by using the general-purpose physical server and the NFV technology, refer to the embodiment in FIG. 6.

It should be understood that, the controller 801 and the first forwarding sub-device 802 in the first network device 80 in this embodiment may implement various functions and steps implemented by the first network device in the method embodiment. For brevity, details are not described herein again.

In addition, an embodiment provides a computer storage medium configured to store a computer software instruction used by the foregoing first network device. The computer software instruction includes a program designed for performing the foregoing method embodiment.

Figure 9:
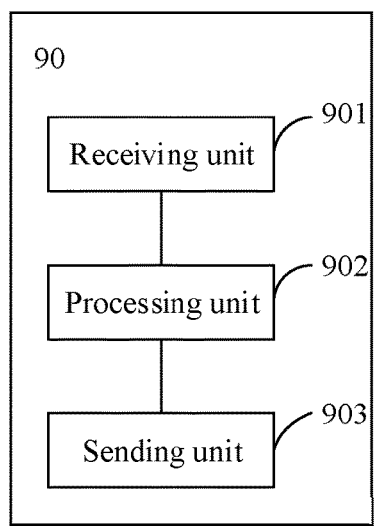
FIG. 9 is a schematic structural diagram of a second network device according to an embodiment.

FIG. 9 is a schematic structural diagram of a second network device 90 according to an embodiment. As shown in FIG. 9, the second network device 90 includes a receiving unit 901, a processing unit 902, and a sending unit 903.

The receiving unit 901 is configured to receive first GRASP information sent by a first network device, where the first GRASP information includes objective information, the objective information is used to carry configuration information, the configuration information includes a plurality of pieces of VTEP device information, each of the plurality of pieces of VTEP device information includes a VTEP device identifier and a VXLAN network identifier VNI, and the VTEP device identifier corresponds to the VNI.

The processing unit 902 is configured to: when the processing unit 902 determines that a device identifier of the second network device is the same as a second VTEP device identifier included in second VTEP device information, determine that the second network device is a second VTEP, where the second VTEP device information is used to indicate the second VTEP.

The processing unit 902 is further configured to generate second VTEP information based on the second VTEP device information, where the second VTEP device information further includes a second VNI corresponding to the second VTEP device identifier, the second VTEP information includes a second VTEP address and the second VNI, and the second VTEP address is bound to the second VNI.

The sending unit 903 is configured to send second GRASP information to a third network device, where the second GRASP information includes the second VTEP information, and the second GRASP information is used to trigger the third network device to establish a VXLAN tunnel based on the second GRASP information.

Optionally, the receiving unit 901 is further configured to receive third GRASP information sent by the third network device, where the third GRASP information includes first VTEP information, the first VTEP information includes a first VTEP address and a first VNI, and the first VTEP address is bound to the first VNI; and the processing unit 902 is further configured to establish a VXLAN tunnel from the second network device to the third network device based on the first VTEP information and the second VTEP information when the processing unit 902 determines that the first VNI is the same as the second VNI.

Optionally, the sending unit 903 is further configured to forward the first GRASP information to the third network device, where the first GRASP information is used to trigger the third network device to establish a VXLAN tunnel based on the first GRASP information.

Optionally, each of the plurality of pieces of VTEP device information further includes a VTEP access-side port identifier, the VTEP access-side port identifier corresponds to the VTEP device identifier, and the processing unit 902 is further configured to determine, based on a second VTEP access-side port identifier included in the second VTEP device information, a layer 2 sub-interface of the second network device and a first BD corresponding to the layer 2 sub-interface, where the second VTEP access-side port identifier corresponds to the second VTEP device identifier, the layer 2 sub-interface is configured to connect to a virtual machine VM, and the second VNI is used to indicate that the VM belongs to the first BD.

Optionally, after the processing unit 902 determines that the second network device is the second VTEP, the processing unit 902 is further configured to: generate a second loopback address, and determine the second loopback address as the second VTEP address, where the second loopback address includes an identifier of the second network device, a reserved bit, and a fixed value.

The second network device shown in FIG. 9 may perform corresponding steps performed by the second network device in the method in the foregoing embodiment, to implement automatic VXLAN configuration, and avoid existing problems of low VXLAN configuration efficiency and a high configuration error rate.

Figure 10:
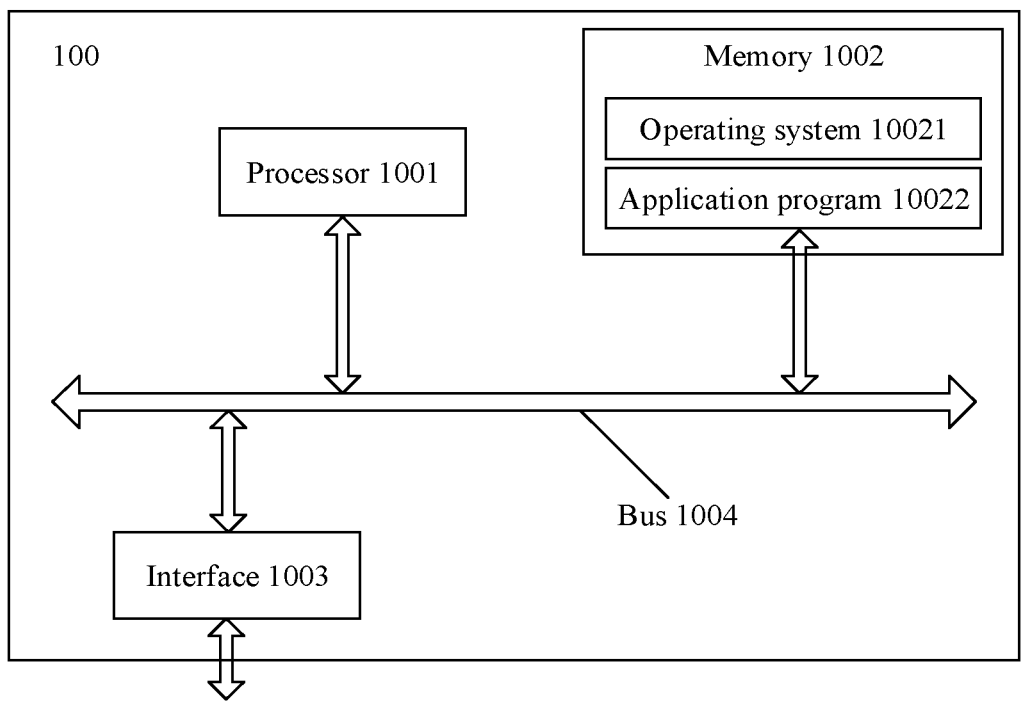
FIG. 10 is a schematic diagram of a hardware structure of a second network device according to an embodiment.

FIG. 10 is a schematic diagram of a hardware structure of a second network device 100 according to an embodiment. The second network device 100 shown in FIG. 10 may perform corresponding steps performed by the second network device in the method in the foregoing embodiment.

As shown in FIG. 10, the second network device 100 includes a processor 1001, a memory 1002, an interface 1003, and a bus 1004. The interface 1003 may be implemented in a wireless or wired manner, and may be specifically a network adapter. The processor 1001, the memory 1002, and the interface 1003 are connected by using the bus 1004.

The interface 1003 may specifically include a transmitter and a receiver, and is used by the second network device to receive information from and send information to the first network device in the foregoing embodiment, or is used by the second network device to receive information from and send information to the third network device in the foregoing embodiment. For example, the interface 1003 is configured to support to receive first GRASP information including configuration information from the first network device and send second GRASP information to the third network device. For example, the interface 1003 is configured to support the processes S104 and S107 in FIG. 3A. The processor 1001 is configured to perform processing performed by the second network device in the foregoing embodiment. For example, the processor 1001 is configured to determine, based on the configuration information, that the second network device is a VTEP, and may be further configured to: generate VTEP information, and/or perform another process used in the technology described in this specification. For example, the processor 1001 is configured to support the processes S105 and S106 in FIG. 3A. The memory 1002 includes an operating system 10021 and an application program 10022, and is configured to store a program, code, or an instruction. When executing the program, code, or instruction, the processor or a hardware device may complete a processing process related to the second network device in the method embodiment. Optionally, the memory 1002 may include a ROM and a RAM. The ROM includes a BIOS or an embedded system, and the RAM includes the application program and the operating system. When the second network device 100 needs to run, a bootloader in the BIOS or the embedded system that is built into the ROM is used to boot a system to start, and boot the second network device 100 to enter a normal running state. After entering the normal running state, the second network device 100 runs the application program and the operating system in the RAM, to complete the processing process related to the second network device in the method embodiment.

It may be understood that FIG. 10 shows merely a simplified design of the second network device 100. In actual application, the second network device may include any quantity of interfaces, processors, or memories.

Figure 11:
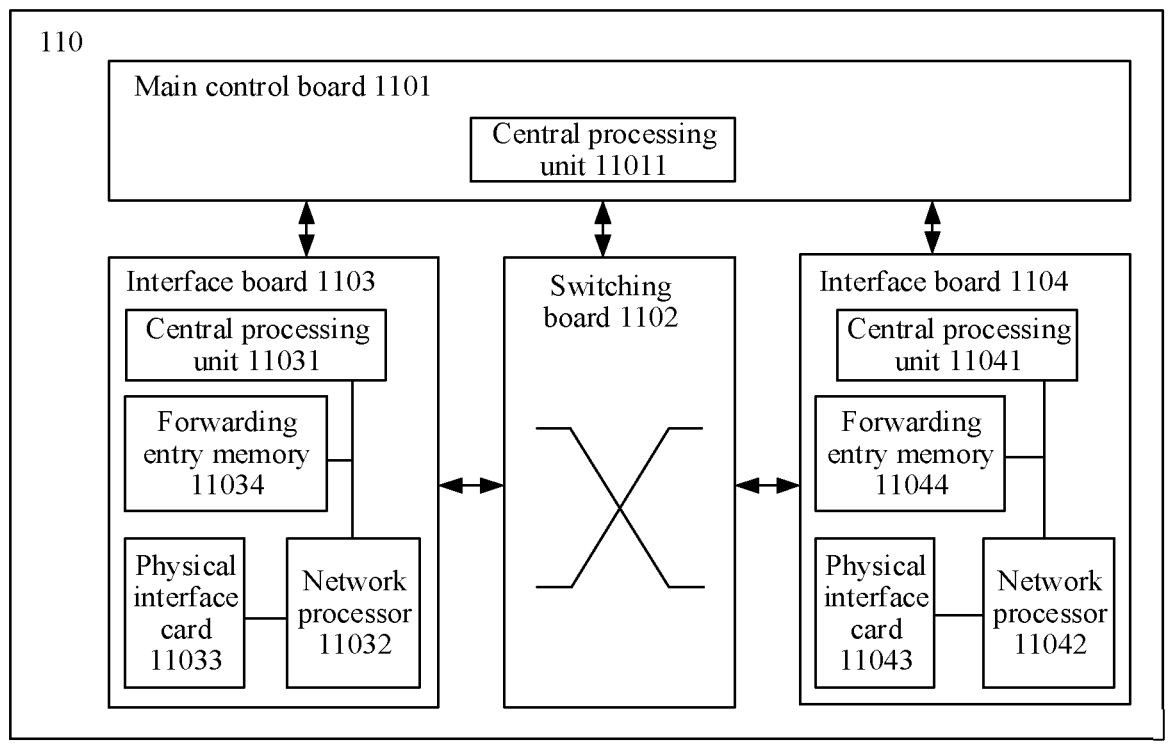
FIG. 11 is a schematic diagram of a hardware structure of another second network device according to an embodiment.

FIG. 11 is a schematic diagram of a hardware structure of another second network device 110 according to an embodiment. The second network device 110 shown in FIG. 11 may perform corresponding steps performed by the second network device in the method in the foregoing embodiment.

As shown in FIG. 11, the second network device 110 includes a main control board 1101, an interface board 1103, a switching board 1102, and an interface board 1104. The main control board 1101, the interface board 1103 and the interface board 1104, and the switching board 1102 are connected to a system backboard by using a system bus for interworking. The main control board 1101 is configured to complete functions such as system management, device maintenance, and protocol processing. The switching board 1102 is configured to complete data exchange between interface boards (the interface board is also referred to as a line card or a service board). The interface board 1103 and the interface board 1104 are configured to: provide various service interfaces (for example, a POS interface, a GE interface, and an ATM interface); and forward a data packet.

The interface board 1103 may include a central processing unit 11031, a forwarding entry memory 11034, a physical interface card 11033, and a network processor 11032. The central processing unit 11031 is configured to: control and manage the interface board, and communicate with a central processing unit on the main control board. The forwarding entry memory 11034 is configured to store a forwarding entry. The physical interface card 11033 is configured to receive and send traffic. The network processor 11032 is configured to control, based on the forwarding entry, the physical interface card 11033 to receive and send the traffic.

Specifically, the physical interface card 11033 receives first GRASP information from the first network device, and sends the first GRASP information to the central processing unit 11011 on the main control board 1101 by using the central processing unit 11031. The central processing unit 11011 is configured to: obtain the first GRASP information, determine that the second network device is a VTEP, and generate second GRASP information carrying VTEP information. The physical interface card 11033 is further configured to send the second GRASP information to the third network device.

The physical interface card 11033 is further configured to receive third GRASP information sent by the third network device, where the third GRASP information includes first VTEP information, the first VTEP information includes a first VTEP address and a first VNI, and the first VTEP address is bound to the first VNI; and the central processing unit 11011 is further configured to establish a VXLAN tunnel from the second network device to the third network device based on the first VTEP information and the second VTEP information when the central processing unit 11011 determines that the first VNI is the same as the second VNI.

The physical interface card 11033 is further configured to forward the first GRASP information to the third network device, where the first GRASP information is used to trigger the third network device to establish a VXLAN tunnel based on the first GRASP information.

The central processing unit 11011 is further configured to determine, based on a second VTEP access-side port identifier included in the second VTEP device information, a layer 2 sub-interface of the second network device and a first BD corresponding to the layer 2 sub-interface, where the second VTEP access-side port identifier corresponds to the second VTEP device identifier, the layer 2 sub-interface is configured to connect to a virtual machine VM, and the second VNI is used to indicate that the VM belongs to the first BD.

After the central processing unit 11011 determines that the second network device is the second VTEP, the central processing unit 11011 is further configured to: generate a second loopback address, and determine the second loopback address as the second VTEP address, where the second loopback address includes an identifier of the second network device, a reserved bit, and a fixed value.

It should be understood that operations on the interface board 1104 are consistent with the operations on the interface board 1103 in this embodiment. For brevity, details are not described again.

It should be understood that the second network device 110 in this embodiment may correspond to the functions and/or the various implemented steps in the foregoing method embodiment. Details are not described herein again.

In addition, it should be noted that there may be one or more main control boards. When there are a plurality of main control boards, a primary main control board and a secondary main control board may be included. There may be one or more interface boards, and the second network device with a stronger data processing capability provides more interface boards. There may also be one or more physical interface cards on the interface board. There may be no switching board or one or more switching boards. When there are a plurality of switching boards, load sharing and redundancy backup may be implemented together. In a centralized forwarding architecture, the second network device may need no switching board, and the interface board provides a function of processing service data in an entire system. In a distributed forwarding architecture, the second network device may have at least one switching board, and exchange data between a plurality of interface boards by using the switching board, to provide a large-capacity data exchange and processing capability. Therefore, a data access and processing capability of the second network device in the distributed architecture is better than that of the device in the centralized architecture. Which architecture is specifically used depends on a specific networking deployment scenario, and is not limited herein.

Figure 12:
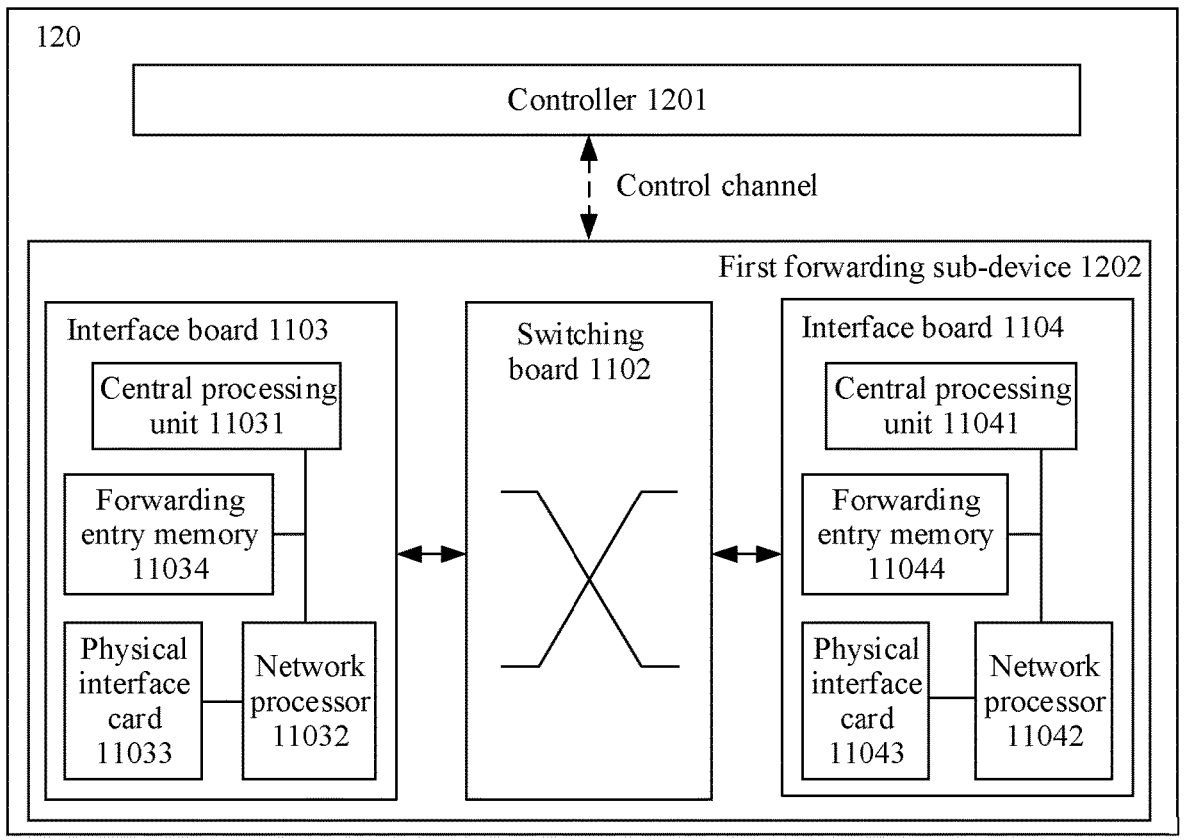
FIG. 12 is a schematic diagram of a hardware structure of still another second network device according to an embodiment.

FIG. 12 is a schematic diagram of a hardware structure of still another second network device 120 according to an embodiment. The second network device 120 shown in FIG. 12 may perform corresponding steps performed by the second network device in the method in the foregoing embodiment.

This product form of the second network device 120 is applicable to a network architecture (for example, SDN) based on separation of control and forwarding. In the SDN, the main control board 1101 of the second network device 110 shown in FIG. 11 is separated from the device, to form a new independent physical device (namely, a controller 1201 shown in FIG. 12), and the remaining components form another independent physical device (namely, a first forwarding sub-device 1202 shown in FIG. 12). The controller 1201 interacts with the first forwarding sub-device 1202 by using a control channel protocol. The control channel protocol may be the OpenFlow protocol, the PCEP, the BGP, the I2RS protocol, or the like. In other words, compared with that in the embodiment corresponding to FIG. 11, the second network device 120 in this embodiment includes the separated controller 1201 and the first forwarding sub-device 1202.

The controller 1201 may be implemented based on a general-purpose physical server or a dedicated hardware structure. In a design example, the controller includes a receiver, a processor, a transmitter, a RAM, a ROM, and a bus (not shown in the figure). The processor is coupled to the receiver, the transmitter, the RAM, and the ROM by using the bus. When the controller needs to run, a bootloader in a BIOS or an embedded system that is built into the ROM is used to boot a system to start, and boot the controller to enter a normal running state. After entering the normal running state, the controller runs an application program and an operating system in the RAM, to enable the processor to perform all functions and steps of the main control board 1101 in FIG. 11.

The first forwarding sub-device 1202 may be implemented based on a dedicated hardware structure. A function and a structure of the first forwarding sub-device 1202 is consistent with functions and structures of the interface board 1103, the interface board 1104, and the switching board 1102 in FIG. 11, to perform corresponding functions and steps. Alternatively, the first forwarding sub-device 1202 may be a virtual first forwarding sub-device implemented based on a general-purpose physical server and an NFV technology, and the virtual first forwarding sub-device is a virtual router. In a scenario of the virtual first forwarding sub-device, the interface board, the switching board, and the processor that are included in the first forwarding sub-device in the embodiment of the physical first forwarding sub-device may be considered as an interface resource, a network resource, and a processing resource that are allocated by the first forwarding sub-device to the virtual first forwarding sub-device for use based on a general-purpose physical server in a virtual environment. For details of implementing functions or steps of the first forwarding sub-device by using the general-purpose physical server, or implementing functions or steps of the first forwarding sub-device by using the general-purpose physical server and the NFV technology, refer to the embodiment in FIG. 10.

It should be understood that, the controller 1201 and the first forwarding sub-device 1202 in the second network device 120 in this embodiment may implement various functions and steps implemented by the second network device in the method embodiment. For brevity, details are not described herein again.

In addition, an embodiment provides a computer storage medium, configured to store a computer software instruction used by the foregoing second network device. The computer software instruction includes a program designed for performing the foregoing method embodiment.

An embodiment further includes a VXLAN configuration system. The VXLAN configuration system may include a first network device and a second network device. The first network device may be the first network device in FIG. 5, FIG. 6, FIG. 7, or FIG. 8, and the second network device may be the second network device in FIG. 9, FIG. 10, FIG. 11, or FIG. 12.

Method or algorithm steps described in combination with the content disclosed in this disclosure may be implemented by hardware, or may be implemented by a processor by executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, functions may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and beneficial effects of this disclosure are further described in detail in the foregoing specific implementations. It should be understood that the foregoing descriptions are merely specific implementations of this disclosure.

What is claimed is:

1. A method for virtual extensible local area network (VXLAN) configuration implemented by a first network device, the method comprising:
   obtaining configuration information comprising pieces of virtual extensible local area network tunnel end point (VTEP) device information, wherein the pieces respectively indicate VTEPs comprised in a VXLAN;
   generating first Generic Autonomic Signaling Protocol (GRASP) information based on the configuration information, wherein the first GRASP information comprises objective information, and wherein the objective information carries the configuration information; and
   sending the first GRASP information to a second network device to trigger the second network device to establish a VXLAN tunnel based on the first GRASP information.

2. The method of claim 1, wherein each of the pieces comprises a VTEP device identifier and a corresponding VXLAN network identifier (VNI), and wherein the method further comprises:
   determining that the first network device is a first VTEP when a device identifier of the first network device is the same as a first VTEP device identifier comprised in first VTEP device information, wherein the first VTEP device information indicates the first VTEP;
   generating first VTEP information based on the first VTEP device information, wherein the first VTEP device information further comprises a first VNI corresponding to the first VTEP device identifier, wherein the first VTEP information comprises a first VTEP address and the first VNI, and wherein the first VTEP address is bound to the first VNI; and sending, to the second network device, second GRASP information comprising the first VTEP information.

3. The method of claim 2, further comprising:

receiving, from the second network device, third GRASP information comprising second VTEP information, wherein the second VTEP information comprises a second VTEP address and a second VNI, and wherein the second VTEP address is bound to the second VNI; and establishing the VXLAN tunnel from the first network device to the second network device based on the first VTEP information and the second VTEP information when the first VNI is the same as the second VNI.

4. The method of claim 2, wherein each of the pieces further comprises a VTEP access-side port identifier corresponding to the VTEP device identifier, and wherein the method further comprises:

connecting to a virtual machine (VM) using a layer 2 sub-interface; and determining, based on a first VTEP access-side port identifier comprised in the first VTEP device information, the layer 2 sub-interface and a first broadcast domain (BD) corresponding to the layer 2 sub-interface, wherein the first VTEP access-side port identifier corresponds to the first VTEP device identifier, and wherein the first VNI indicates that the VM belongs to the first BD.

5. The method of claim 2, wherein the first VTEP device information further comprises a first loopback address, wherein the first loopback address corresponds to the first VTEP device identifier, and wherein the method further comprises determining the first loopback address as the first VTEP address.

6. A method for virtual extensible local area network (VXLAN) configuration implemented by a second network device, the method comprising:

receiving, from a first network device, first Generic Autonomic Signaling Protocol (GRASP) information comprising objective information, wherein the objective information carries configuration information, wherein the configuration information comprises pieces of virtual extensible local area network tunnel end point (VTEP) device information, wherein each of the pieces comprises a VTEP device identifier and a VXLAN network identifier (VNI), and wherein the VTEP device identifier corresponds to the VNI;

determining that the second network device is a second VTEP when a device identifier of the second network device is the same as a second VTEP device identifier comprised in second VTEP device information, wherein the second VTEP device information indicates the second VTEP;

generating second VTEP information based on the second VTEP device information, wherein the second VTEP device information further comprises a second VNI corresponding to the second VTEP device identifier, wherein the second VTEP information comprises a second VTEP address and the second VNI, and wherein the second VTEP address is bound to the second VNI; and sending, to a third network device, second GRASP information comprising the second VTEP information to trigger the third network device to establish a VXLAN tunnel based on the second GRASP information.

7. The method of claim 6, further comprising:

receiving, from the third network device, third GRASP information comprising first VTEP information, wherein the first VTEP information comprises a first VTEP address and a first VNI, and wherein the first VTEP address is bound to the first VNI; and establishing the VXLAN tunnel from the second network device to the third network device based on the first VTEP information and the second VTEP information when the first VNI is the same as the second VNI.

8. The method of claim 6, wherein the third network device is the first network device.

9. The method of claim 6, further comprising forwarding, to the third network device, the first GRASP information to trigger the third network device to establish the VXLAN tunnel based on the first GRASP information.

10. The method of claim 6, wherein each of the pieces further comprises a VTEP access-side port identifier, wherein the VTEP access-side port identifier corresponds to the VTEP device identifier, and wherein the method further comprises:

connecting to a virtual machine (VM) using a layer 2 sub-interface; and determining, based on a second VTEP access-side port identifier comprised in the second VTEP device information, the layer 2 sub-interface and a first broadcast domain (BD) corresponding to the layer 2 sub-interface, wherein the second VTEP access-side port identifier corresponds to the second VTEP device identifier, and wherein the second VNI indicates that the VM belongs to the first BD.

11. The method of claim 6, wherein after determining that the second network device is the second VTEP, the method further comprises:

generating a second loopback address comprising an identifier of the second network device, a reserved bit, and a fixed value; and determining the second loopback address as the second VTEP address.

12. A first network device comprising:

a receiver configured to obtain configuration information comprising pieces of virtual extensible local area network tunnel end point (VTEP) device information, wherein the pieces respectively indicate VTEPs comprised in a virtual extensible local area network (VXLAN);

a processor coupled to the receiver and configured to generate first Generic Autonomic Signaling Protocol (GRASP) information based on the configuration information obtained by the receiver, wherein the first GRASP information comprises objective information, and wherein the objective information carries the configuration information; and a transmitter coupled to the processor and configured to send the first GRASP information to a second network device to trigger the second network device to establish a VXLAN tunnel based on the first GRASP information.

13. The first network device of claim 12, wherein each of the pieces comprises a VTEP device identifier and a corresponding VXLAN network identifier (VNI), and wherein the processor is further configured to:

determine that the first network device is a first VTEP when a device identifier of the first network device is the same as a first VTEP device identifier comprised in first VTEP device information, wherein the first VTEP device information indicates the first VTEP; and generate first VTEP information based on the first VTEP device information, wherein the first VTEP device information further comprises a first VNI corresponding to the first VTEP device identifier, wherein the first VTEP information comprises a first VTEP address and the first VNI, and wherein the first VTEP address is bound to the first VNI, wherein the transmitter is further configured to send, to the second network device, second GRASP information comprising the first VTEP information.

14. The first network device of claim 13, wherein the receiver is further configured to receive, from the second network device, third GRASP information comprising second VTEP information, wherein the second VTEP information comprises a second VTEP address and a second VNI, wherein the second VTEP address is bound to the second VNI, and wherein the processor is further configured to establish the VXLAN tunnel from the first network device to the second network device based on the first VTEP information and the second VTEP information when the first VNI is the same as the second VNI.

15. The first network device of claim 13, further comprising a layer 2 sub-interface configured to connect to a virtual machine (VM), wherein each of the pieces further comprises a VTEP access-side port identifier corresponding to the VTEP device identifier, wherein the processor is further configured to determine, based on a first VTEP access-side port identifier comprised in the first VTEP device information, the layer 2 sub-interface and a first broadcast domain (BD) corresponding to the layer 2 sub-interface, wherein the first VTEP access-side port identifier corresponds to the first VTEP device identifier, and wherein the first VNI indicates that the VM belongs to the first BD.

16. The first network device of claim 13, wherein the first VTEP device information further comprises a first loopback address, wherein the first loopback address corresponds to the first VTEP device identifier, and wherein the processor is further configured to determine the first loopback address as the first VTEP address.

17. A second network device comprising:
a transmitter;
a receiver configured to receive, from a first network device, first Generic Autonomic Signaling Protocol (GRASP) information comprising objective information, wherein the objective information carries configuration information, wherein the configuration information comprises pieces of virtual extensible local area network tunnel end point (VTEP) device information, wherein each of the pieces comprises a VTEP device identifier and a virtual extensible local area network (VXLAN) network identifier (VNI), and wherein the VTEP device identifier corresponds to the VNI; and
a processor coupled to the transmitter and the receiver and configured to determine that the second network device is a second VTEP when a device identifier of the second network device is the same as a second VTEP device identifier comprised in second VTEP device information, wherein the second VTEP device information indicates the second VTEP, wherein the processor is further configured to generate second VTEP information based on the second VTEP device information, wherein the second VTEP device information further comprises a second VNI corresponding to the second VTEP device identifier, wherein the second VTEP information comprises a second VTEP address and the second VNI, and wherein the second VTEP address is bound to the second VNI, and wherein the transmitter is configured to send to a third network device, second GRASP information comprising the second VTEP information to trigger the third network device to establish a VXLAN tunnel based on the second GRASP information.

18. The second network device of claim 17, wherein the receiver is further configured to receive, from the third network device, third GRASP information comprising first VTEP information, wherein the first VTEP information comprises a first VTEP address and a first VNI, wherein the first VTEP address is bound to the first VNI and wherein the processor is further configured to establish the VXLAN tunnel from the second network device to the third network device based on the first VTEP information and the second VTEP information when the first VNI is the same as the second VNI.

19. The second network device of claim 17, wherein the third network device is the first network device.

20. The second network device of claim 17, wherein the transmitter is further configured to forward, to the third network device, the first GRASP information to trigger the third network device to establish the VXLAN tunnel based on the first GRASP information.

21. The second network device of claim 17, further comprising a layer 2 sub-interface configured to connect to a virtual machine (VM), wherein each of the pieces further comprises a VTEP access-side port identifier, wherein the VTEP access-side port identifier corresponds to the VTEP device identifier, wherein the processor is further configured to determine, based on a second VTEP access-side port identifier comprised in the second VTEP device information, the layer 2 sub-interface and a first broadcast domain (BD) corresponding to the layer 2 sub-interface, wherein the second VTEP access-side port identifier corresponds to the second VTEP device identifier, and wherein the second VNI indicates that the VM belongs to the first BD.

22. The second network device of claim 17, wherein after determining that the second network device is the second VTEP, the processor is further configured to:
generate a second loopback address comprising an identifier of the second network device, a reserved bit, and a fixed value; and
determine the second loopback address as the second VTEP address.

* * * * *